United States Patent
Murakami et al.

(10) Patent No.: US 10,419,698 B2
(45) Date of Patent: Sep. 17, 2019

(54) IMAGE PROCESSING APPARATUS AND IMAGE PROCESSING METHOD

(71) Applicant: CANON KABUSHIKI KAISHA, Tokyo (JP)

(72) Inventors: Tomochika Murakami, Ichikawa (JP); Kazuya Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 15/336,976

(22) Filed: Oct. 28, 2016

(65) Prior Publication Data
US 2017/0142358 A1 May 18, 2017

(30) Foreign Application Priority Data

Nov. 12, 2015 (JP) .................. 2015-222001
Jul. 28, 2016 (JP) .................. 2016-148730

(51) Int. Cl.
| | |
|---|---|
| *H04N 5/365* | (2011.01) |
| *H04N 5/225* | (2006.01) |
| *G02B 21/36* | (2006.01) |
| *G02B 21/24* | (2006.01) |
| *G02B 5/00* | (2006.01) |
| *G02B 21/08* | (2006.01) |
| *G02B 21/26* | (2006.01) |

(52) U.S. Cl.
CPC ............ *H04N 5/365* (2013.01); *G02B 5/005* (2013.01); *G02B 21/086* (2013.01); *G02B 21/241* (2013.01); *G02B 21/26* (2013.01); *G02B 21/361* (2013.01); *G02B 21/367* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 2003/0156762 A1 | 8/2003 | August | |
| 2006/0227211 A1* | 10/2006 | Kotake | G01C 11/00 348/141 |
| 2006/0279632 A1* | 12/2006 | Anderson | H04N 5/33 348/164 |
| 2009/0196478 A1 | 8/2009 | Lustig et al. | |
| 2011/0096205 A1 | 4/2011 | Kumar et al. | |
| 2012/0075354 A1 | 3/2012 | Su et al. | |

(Continued)

FOREIGN PATENT DOCUMENTS

| | | |
|---|---|---|
| JP | 2007-128009 A | 5/2007 |
| JP | 2013-207788 A | 10/2013 |

*Primary Examiner* — Xiaolan Xu
(74) *Attorney, Agent, or Firm* — Venable LLP

(57) ABSTRACT

An image processing method, includes: an input step in which a computer acquires data of a plurality of input images acquired by imaging performed using a same image sensor; and an optimization process step in which a computer determines an optimal solution of brightness change with respect to each input image by performing iterative calculations using an iterative method to improve overall image quality of the plurality of input images. In the optimization process step, an optimal solution of brightness change for each pixel of each input image is determined under a condition that common brightness change is performed with respect to pixels at a same position in respective input images.

44 Claims, 13 Drawing Sheets

(56) References Cited

U.S. PATENT DOCUMENTS

| | | | |
|---|---|---|---|
| 2012/0078977 A1* | 3/2012 | Shibata | G06F 17/30793 707/803 |
| 2012/0212599 A1 | 8/2012 | Murakami | |
| 2013/0156340 A1* | 6/2013 | Porikli | G06T 5/002 382/275 |
| 2014/0098213 A1* | 4/2014 | Sato | G02B 21/367 348/79 |
| 2014/0267654 A1* | 9/2014 | Blanquart | H04N 5/365 348/65 |
| 2014/0298153 A1 | 10/2014 | Tsujimoto et al. | |
| 2014/0334745 A1* | 11/2014 | Fleischer | G06T 3/4061 382/284 |
| 2017/0074768 A1* | 3/2017 | Moitzi | G01N 15/0227 |

* cited by examiner

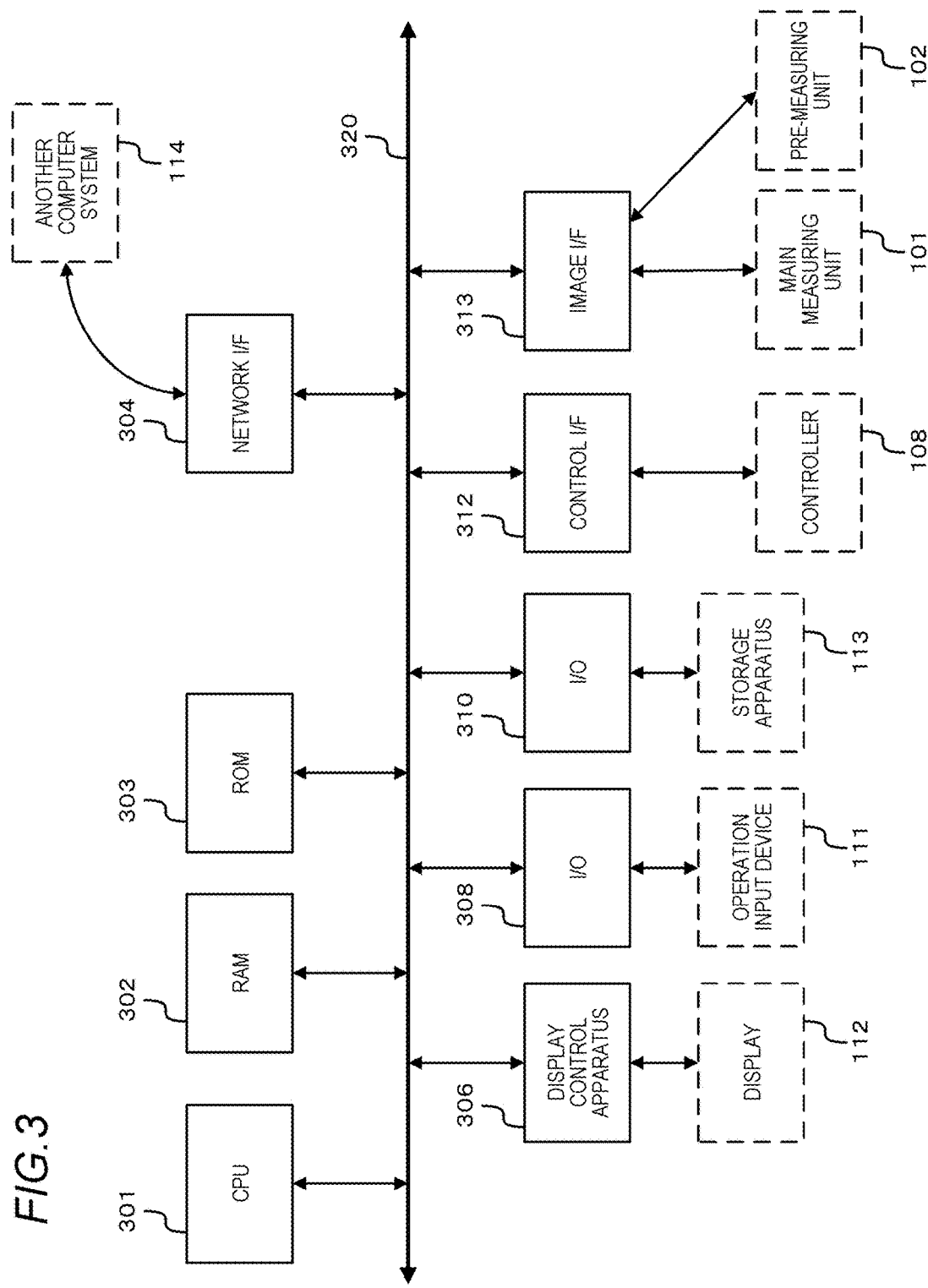

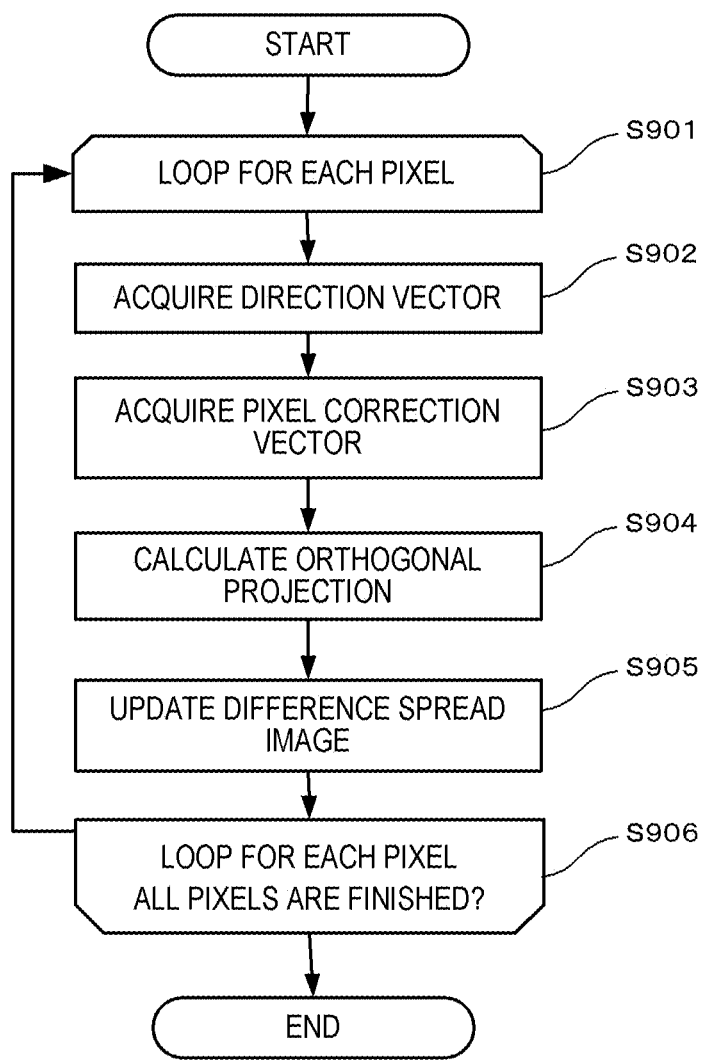

IMAGE PROCESSING APPARATUS AND IMAGE PROCESSING METHOD

BACKGROUND OF THE INVENTION

Field of the Invention

The present invention relates to a technique for reducing fixed-pattern noise included in a group of images constituted by a plurality of images (for example, a plurality of images photographed by changing focusing positions, or moving image data) to enhance image quality.

Description of the Related Art

Techniques are known in which an arbitrary viewpoint image or an arbitrary out-of-focus image is generated, through restoration of a light beam space, from a group of a plurality of images that are obtained through an imaging optical system of a camera, a microscope, etc. photographing an object by changing focusing positions (such an image group is hereinafter referred to as an out-of-focus image group). For example, Japanese Patent Application Laid-open No. 2007-128009 discloses a method of generating an arbitrary viewpoint image or an arbitrary out-of-focus image by performing a coordinate transformation process of each image so that the image matches a three-dimensional convolution model and performing a three-dimensional filtering process for changing a blur on a three-dimensional frequency space. Also in documents other than Japanese Patent Application Laid-open No. 2007-128009, methods are proposed for generating an arbitrary viewpoint image or an arbitrary out-of-focus image by restoring a light beam space through a filtering process carried out on integral images of an out-of-focus image group in a viewpoint direction, using formulae that are approximately equivalent mathematically. In the present specification, image generation methods in which an arbitrary viewpoint image or an arbitrary out-of-focus image is generated from an out-of-focus image group through restoration of a light beam space will be collectively referred to as "filter type methods".

By applying such filter type methods to an out-of-focus image group having been photographed with a camera, a microscope, or the like, functions conventionally unavailable can be provided by means of post-processing after photography, without having to alter an optical system of the camera or the microscope. For example, in the case of a camera, a new way of enjoying photographs can be provided where it is possible to change a blur quality after photography. In the case of a microscope, a stereoscopic shape of an object can be intuitively discerned by changing a point of view. In addition, during high-magnification observation using a lens with a large numerical aperture, increasing a depth of field can prevent a lesion outside of a focusing position from being overlooked.

SUMMARY OF THE INVENTION

The related art described above, however, has the following problems. When filter type methods such as the representative example disclosed in Japanese Patent Application Laid-open No. 2007-128009 are applied to an out-of-focus image group, a problem may occur in that image quality of a generated image deteriorates due to fixed-pattern noise attributable to an image sensor. This problem becomes conspicuous when image magnification and reduction (changes in scale) among images constituting the out-of-focus image group is significantly small, or in other words, in the case of a group of images in which fixed-pattern noise appears in the images at approximately the same positions. Such an out-of-focus image group is obtained when photography is performed by an optical system, e.g. a double-telecentric optical system, in which relative positions and sizes of an image and an image sensor hardly change even when changing focusing positions.

As a measure to the problem described above, US2014/0098213A1 discloses a method of avoiding fixed-pattern noise by controlling the imaging apparatus. In this method, when photographing an object by changing focusing positions, fixed-pattern noise is prevented from being superimposed at a single pixel of an out-of-focus image group by performing photography while shifting relative positions of an image and an image sensor for each focusing position. However, this method cannot be applied to improve image quality when an all-in-focus image is obtained from an out-of-focus image group which has already been photographed.

While problems that occur in an out-of-focus image group have been described above, a similar problem may also occur in a group of images such as moving image data that is photographed by a same optical system. Japanese Patent Application Laid-open No. 2013-207788 discloses a method of reducing fixed-pattern noise in a moving image. However, since this method is constituted by a simplified process which involves estimating as fixed-pattern noise a difference image obtained by subtracting an average value from a relatively flat region, then estimation accuracy of the fixed-pattern noise is low. Therefore, in principle, it is difficult to realize reduction of fixed-pattern noise with high accuracy in image data including images of various objects. In addition, noises other than additive fixed-pattern noise such as multiplicative fixed-pattern noise attributable to a variation in sensitivity of a light receiving unit among cells of an image sensor or a variation in gain of an amplifier cannot be reduced. Note that, in the present specification, a pixel of an image sensor will be referred to as a "cell" in order to distinguish a pixel of an image sensor from a pixel of image data.

The present invention has been made in consideration of the problems described above and an object thereof is to provide a novel technique for reducing fixed-pattern noise which is attributable to an image sensor and which is included in a plurality of images acquired by a same image sensor.

The present invention in its first aspect provides an image processing method, comprising: an input step in which a computer acquires data of a plurality of input images acquired by imaging performed using a same image sensor; and an optimization process step in which a computer determines an optimal solution of brightness change with respect to each input image by performing iterative calculations using an iterative method to improve overall image quality of the plurality of input images, wherein in the optimization process step, an optimal solution of brightness change for each pixel of each input image is determined under a condition that common brightness change is performed with respect to pixels at a same position in respective input images.

The present invention in its second aspect provides a non-transitory computer readable storage medium storing therein a program that causes a computer to execute respective steps of an image processing method, the image processing method including: an input step in which the computer acquires data of a plurality of input images acquired by imaging performed using a same image sensor; and an optimization process step in which the computer determines an optimal solution of brightness change with respect to each input image by performing iterative calculations using an iterative method to improve overall image quality of the plurality of input images, wherein in the optimization process step, an optimal solution of brightness change for each pixel of each input image is determined under a condition that common brightness change is performed with respect to pixels at a same position in respective input images.

The present invention in its third aspect provides an image processing apparatus, comprising: an input unit configured to acquire data of a plurality of input images acquired by imaging performed using a same image sensor; and an optimization process unit configured to determine an optimal solution of brightness change with respect to each input image by performing iterative calculations using an iterative method to improve overall image quality of the plurality of input images, wherein the optimization process unit determines an optimal solution of brightness change for each pixel of each input image under a condition that common brightness change is performed with respect to pixels at a same position in respective input images.

According to the present invention, fixed-pattern noise which is attributable to an image sensor and which is included in a plurality of images acquired by a same image sensor can be reduced.

Further features of the present invention will become apparent from the following description of exemplary embodiments with reference to the attached drawings.

BRIEF DESCRIPTION OF THE DRAWINGS

FIG. 3 is a diagram showing an internal configuration of an image processing apparatus (a host computer) 110;

FIG. 9 is a flow chart showing internal processing of a constraint C1 application step S702;

DESCRIPTION OF THE EMBODIMENTS

The present invention relates to a technique for reducing, by image processing (post-processing), fixed-pattern noise included in a group of images (for example, an out-of-focus image group or moving image data) constituted by a plurality of images photographed using a same optical system (imaging system). A configuration or a method according to the present invention is applicable to images obtained by various imaging apparatuses including a digital camera, a digital video camera, a digital microscope, and a virtual slide system. In particular, the present invention can be favorably applied to an out-of-focus image group photographed by a double-telecentric optical system which is significantly affected by fixed-pattern noise.

As will be described in detail later, with image processing according to the present invention, an image can be obtained in which fixed-pattern noise attributable to an image sensor of an imaging apparatus is reduced with high accuracy. In addition, by reducing fixed-pattern noise in an out-of-focus image group, image quality deterioration which poses a problem when generating an arbitrary viewpoint image or an arbitrary out-of-focus image by a filter type method from an out-of-focus image group can be suppressed. Furthermore, by combining an image processing system according to the present invention with an imaging apparatus, performance requirements that are demanded in an image sensor of the imaging apparatus can be relaxed and an improvement in a degree of design freedom and realization of low cost of an image sensor can be advantageously achieved.

<First Embodiment>
(Overall System Configuration)

Figure 1:
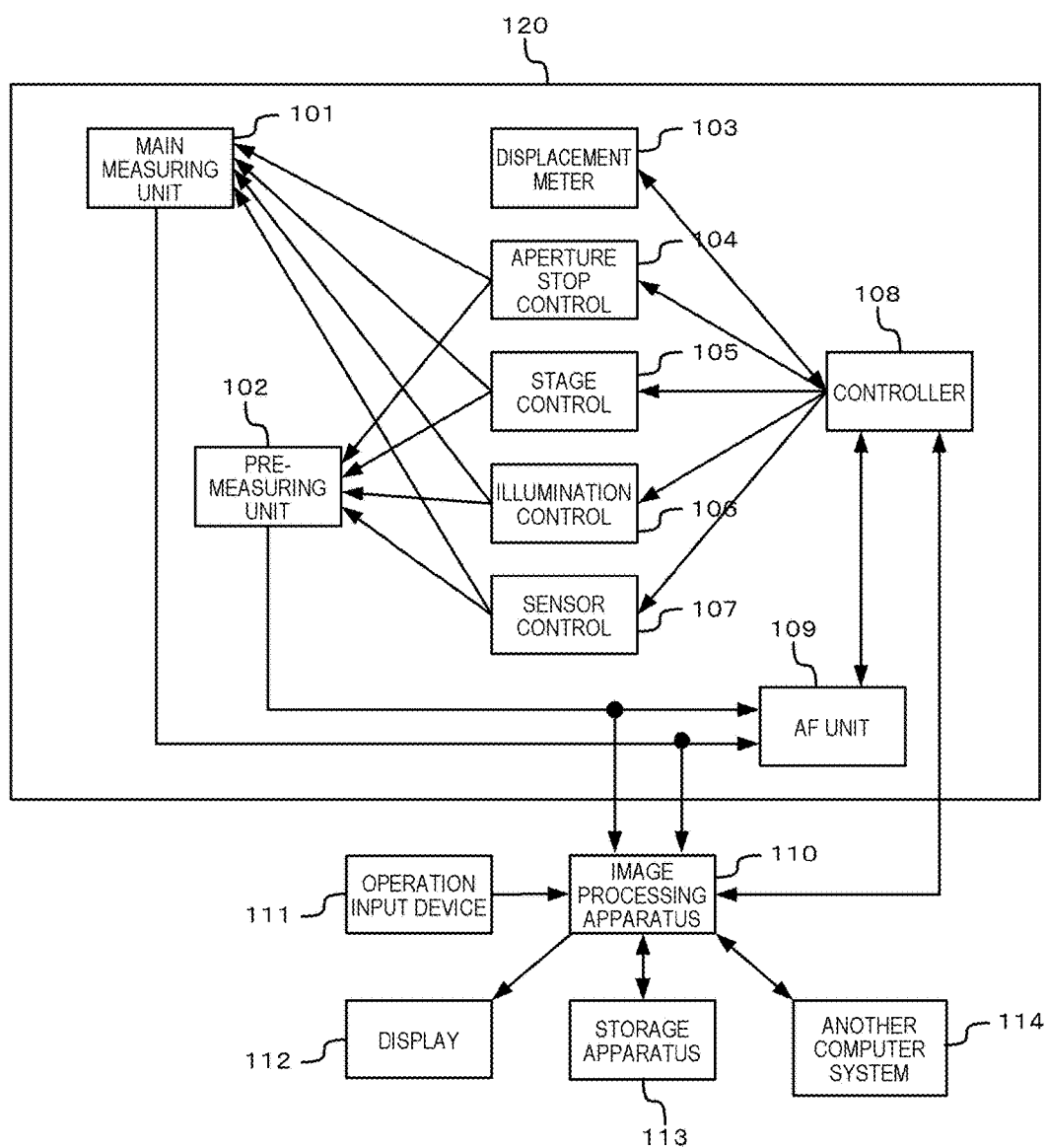
FIG. 1 is a diagram showing a configuration of a virtual slide system.

In a first embodiment, an example in which the present invention is applied to a virtual slide system configured as shown in FIG. 1 will be described.

The virtual slide system is constituted by an imaging apparatus (also referred to as virtual slide scanner) 120 which acquires imaging data of a specimen, an image processing apparatus (also referred to as host computer) 110 which performs data processing and control of the imaging data, and peripheral apparatuses of the image processing apparatus 110.

An operation input device 111 such as a keyboard and a mouse which receives an input from a user and a display 112 which displays a processed image are connected to the image processing apparatus 110. In addition, a storage apparatus 113 and another computer system 114 are connected to the image processing apparatus 110.

When imaging of a large number of specimens (slides) is performed by batch processing, the imaging apparatus 120 sequentially images the respective specimens under the control by the image processing apparatus 110 and the image processing apparatus 110 applies necessary processing to image data of each specimen. The obtained image data of each specimen is transmitted to and accumulated in the storage apparatus 113 which is a large-capacity data storage or the other computer system 114.

Imaging (pre-measurement and main measurement) by the imaging apparatus 120 is realized as the image processing apparatus 110, in response to receiving an input by a user, sends an instruction to a controller 108 and the controller 108 controls a main measuring unit 101 and a pre-measuring unit 102.

The main measuring unit 101 is an imaging unit which acquires a high-definition image to be used to diagnose a specimen in a slide. The pre-measuring unit 102 is an imaging unit which performs imaging prior to main measurement. The pre-measuring unit 102 performs image acquisition for the purpose of acquiring imaging control information which enables image acquisition to be performed with high accuracy in the main measurement.

A displacement meter 103 is connected to the controller 108 to enable measurement of the position of and the distance to a slide set on a stage in the main measuring unit 101 or the pre-measuring unit 102. The displacement meter 103 is used to measure a thickness of a specimen in the slide when performing main measurement and pre-measurement.

In addition, an aperture stop control 104 for controlling an imaging condition of the main measuring unit 101 and the pre-measuring unit 102, a stage control 105, an illumination control 106, and a sensor control 107 are connected to the controller 108. The respective controls are configured to control operations of an aperture stop, a stage, illumination, and an image sensor in accordance with to control signals from the controller 108.

The stage is a mechanism for holding, moving, and positioning a slide. The stage includes an XY stage which moves the slide in a direction perpendicular to an optical axis and a Z stage which moves the slide in a direction extending along the optical axis. The XY stage is used to move an imaging area in a specimen in directions (x and y directions) perpendicular to the optical axis and the Z stage is used to change a focusing position in a depth direction (z direction) in the specimen. Although not illustrated, the imaging apparatus 120 is provided with a rack in which a plurality of slides can be set and a conveying mechanism which feeds a slide from the rack to an imaging position on the stage. In the case of batch processing, under the control of the controller 108, the conveying mechanism sequentially feeds one slide at a time from the rack to a stage of the pre-measuring unit 102 and to a stage of the main measuring unit 101.

An AF unit 109 which realizes automatic focusing using a captured image is connected to the main measuring unit 101 and the pre-measuring unit 102. The AF unit 109 is capable of finding a focusing position by controlling positions of the stages of the main measuring unit 101 and the pre-measuring unit 102 via the controller 108. Automatic focusing adopts a passive system which uses an image. A known phase difference detection system or a known contrast detection system is used.

(Configuration of Main Measuring Unit)

Figure 2:
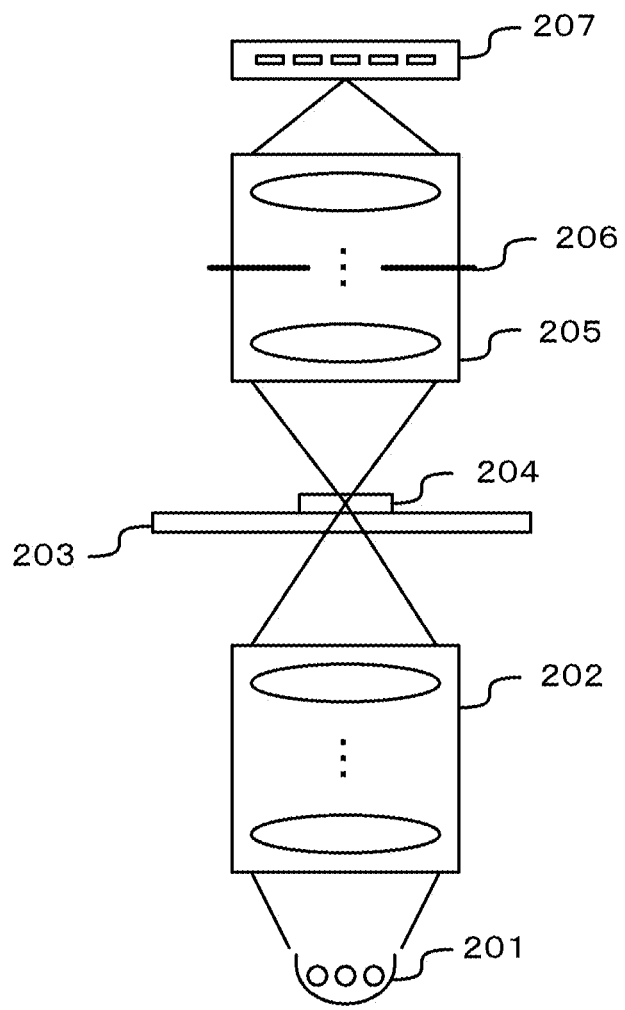
FIG. 2 is a diagram showing an internal configuration of a main measuring unit 101.

FIG. 2 is a diagram showing an internal configuration of the main measuring unit 101 according to the first embodiment.

Light from a light source 201 is uniformalized in an illumination optical system 202 to eliminate light amount irregularity and with this light a slide 204 set on a stage 203 is irradiated. The slide 204 is a specimen (an object) prepared so as to be observable by pasting a slice of tissue or a smeared cell that is an observation object on a slide glass and fixing the same under a cover glass together with a mounting agent.

An imaging optical system 205 enlarges an image of the specimen and guides the enlarged image to an imaging unit 207 that is imaging means. Light having passed through the slide 204 forms an image on an imaging surface of the imaging unit 207 via the imaging optical system 205. An aperture stop 206 is present in the imaging optical system 205, whereby a depth of field can be controlled by adjusting the aperture stop 206.

When performing imaging, the light source 201 is lit to irradiate the slide 204 with light. An image formed on the imaging surface through the illumination optical system 202, the slide 204, and the imaging optical system 205 is received by an imaging sensor of the imaging unit 207. During monochrome (gray scale) imaging, the light source 201 emits white light for exposure and the imaging is performed once. During color imaging, exposure is sequentially performed by three light sources 201 in RGB and the imaging is performed three times to acquire a color image.

The image of the specimen formed on the imaging surface is photoelectrically converted by the imaging unit 207 and, after being subjected to A/D conversion, the image is sent to the image processing apparatus 110 as an electric signal. While it is assumed that the imaging unit 207 is constituted by a plurality of image sensors, alternatively, the imaging unit 207 may be constituted by a single sensor. In addition, the present embodiment assumes that noise reduction including a process of reducing fixed-pattern noise due to an image sensor and a development process represented by a color conversion process and a sharpening process after the execution of the A/D conversion are performed inside the image processing apparatus 110. However, the development process can be performed in a dedicated image processing unit (not illustrated) connected to the imaging unit 207 and data can be subsequently transmitted to the image processing apparatus 110. It is to be understood that such embodiments also fall within the scope of the present invention.

When an image of an entire specimen cannot be acquired by one photographing operation, a plurality of split photographing operations are performed by moving the stage 203 (the XY stage) in the x direction and/or the y direction, and an image of the entire specimen is generated by compositing (splicing together) the obtained plurality of split images. In addition, a plurality of images with different focusing positions in the optical axis direction (the depth direction) are acquired by performing a plurality of photographing operations while moving the stage 203 (the Z stage) in the z direction. In the present specification, a group of images constituted by a plurality of images obtained by imaging an object while altering the focusing position in the optical axis direction of the imaging optical system will be referred to as an "out-of-focus image group". Moreover, an out-of-focus image group may also be referred to as a "Z stack image" and each image constituting the out-of-focus image group may also be referred to as a "layer image".

(Configuration of Image Processing Apparatus)

FIG. 3 is a diagram showing an internal configuration of the image processing apparatus (the host computer) 110 according to the present embodiment.

A CPU (a processor) 301 controls the entire image processing apparatus using programs and data stored in a RAM 302 and a ROM 303. In addition, the CPU 301 performs various arithmetic processing and data processing such as a fixed-pattern noise reduction process, a development and correction process, a compositing process, a compression process, and an arbitrary viewpoint/out-of-focus image generation process.

The RAM 302 is a memory which temporarily stores programs and data loaded from the storage apparatus 113 and programs and data downloaded from the other computer system 114 via a network I/F (interface) 304. The RAM 302 also includes a work area necessary for the CPU 301 to perform various kinds of processing. The ROM 303 is a memory which stores a functional program, configuration data, and the like of a computer. A display control apparatus 306 performs control processing for causing the display 112 to display an image, characters, and the like. The display 112 displays an image for requesting the user to perform input and displays an image represented by image data acquired from the imaging apparatus 120 and processed by the CPU 301.

The operation input device 111 is constituted by a device such as a keyboard and a mouse which enables various instructions to be input to the CPU 301. The user inputs information for controlling the operation of the imaging apparatus 120 using the operation input device 111. Reference numeral 308 denotes an I/O for notifying the CPU 301 of various instructions and the like input via the operation input device 111.

The storage apparatus 113 is a large-capacity information storage apparatus such as a hard disk. The storage apparatus 113 stores an operating system (OS) and programs for causing the CPU 301 to execute the processes explained below, image data scanned by batch processing, processed image data, and the like.

Writing of information to the storage apparatus 113 and reading of information from the storage apparatus 113 are performed via an I/O 310. A control I/F 312 is an I/F for exchanging control commands (signals) with the controller 108 for controlling the imaging apparatus 120.

The controller 108 has a function of controlling the main measuring unit 101 and the pre-measuring unit 102. An interface other than those described above such as an external interface for capturing output data of a CMOS image sensor or a CCD image sensor is connected to an image interface (I/F) 313. As the interface, a serial interface such as USB or IEEE1394 or an interface such as a camera link can be used. The main measuring unit 101 and the pre-measuring unit 102 are connected via the image I/F 313.

(Arbitrary Viewpoint/Out-of-Focus Image Generation Program)

The image processing apparatus 110 is mounted with a program for causing a computer to execute an image generation process according to a filter type method which is exemplified by the method disclosed in Japanese Patent Application Laid-open No. 2007-128009 (referred to as an arbitrary viewpoint/out-of-focus image generation program). The image processing apparatus 110 is capable of generating an arbitrary viewpoint image, an arbitrary out-of-focus image, an all-in-focus image, and the like from an out-of-focus image group acquired via the imaging apparatus 120, the storage apparatus 113, and the other computer system 114.

(Explanation of Reason of Prominence of Fixed-Pattern Noise in all-in-Focus Image Generated by Filter Type Method)

Generally, an imaging system of a microscope (the main measuring unit 101 in FIG. 1) uses a double-telecentric optical system and, accordingly, magnification and reduction (changes in scale) of a specimen image among respective images constituting an out-of-focus image group is significantly small. When the filter type method according to Japanese Patent Application Laid-open No. 2007-128009 is applied to such an out-of-focus image group, a coordinate transformation process of each image in order to match the image to a three-dimensional convolution model need not be performed. Therefore, an all-in-focus image a (x,y) is obtained by deconvoluting an integral b (x,y) in the optical axis direction of the out-of-focus image group by an integral c (x,y) in the optical axis direction of a three-dimensional blur. Since deconvolution is a division in a frequency space, the all-in-focus image a (x,y) is determined by the following expression.

$$a(x,y) = \mathcal{F}^{-1}(B(u,v) \cdot C(u,v)^{-1}) \quad (1)$$

where B(u,v)=F(b(x,y)) and C(u,v)=F(c(x,y)), F denotes a Fourier transform, and $F^{-1}$ denotes an inverse Fourier transform. u and v are spatial frequencies respectively corresponding to x and y.

Expression (1) represents that $C(u,v)^{-1}$ becomes a frequency filter with respect to the integral b (x,y) in the optical axis direction of the out-of-focus image group and that an all-in-focus image is generated. As the three-dimensional blur, a Gaussian blur in which a blur radius increases in accordance with a distance from an in-focus position will be considered. In this case, while a value of the frequency filter $C(u,v)^{-1}$ is a reciprocal of the number of images in the out-of-focus image group for a DC component, the value characteristically increases as the frequency increases and approaches 1 at maximum frequency. In other words, while the frequency filter $C(u,v)^{-1}$ has an effect of suppressing low-frequency noise, the frequency filter $C(u,v)^{-1}$ does not have an effect of suppressing high-frequency noise.

Next, a case where additive Gaussian noise with a standard deviation of σ=0.5 is present as time-invariant fixed-pattern noise in each pixel of the out-of-focus image group will be considered. When the out-of-focus image group has 64 images, the fixed-pattern noise is superimposed in the integral b (x,y) in the optical axis direction of the out-of-focus image group and the standard deviation of the fixed-pattern noise is 32. Subsequently, due to the frequency filter $C(u,v)^{-1}$, amplitude of a low-frequency component of the additive Gaussian noise is restored to a minute value near 0.5 in 255 gray levels. However, amplitude of a high-frequency component remains at a large value near 32 in 255 gray levels and may be visually confirmed as large noise in an all-in-focus image.

Due to the reasons described above, when obtaining an all-in-focus image by a filter type method from an out-of-focus image group obtained with a microscope, a deterioration of quality of the all-in-focus image attributable to fixed-pattern noise becomes conspicuous. The influence of fixed-pattern noise increases as the number of images used to generate the all-in-focus image increases.

(Increasing Image Quality of Arbitrary Viewpoint/Out-of-Focus Image)

To generate an arbitrary viewpoint image or an arbitrary out-of-focus image with high image quality, as pre-processing with respect to an out-of-focus image group to be input to the arbitrary viewpoint/out-of-focus image generation program, a fixed-pattern noise reduction process to be described below is favorably performed to reduce fixed-pattern noise in the out-of-focus image group in advance. Moreover, since fixed-pattern noise may be weak as described above, desirably, a pixel value of an image of the out-of-focus image group after fixed-pattern noise reduction is not quantized to an integer value and is input to the arbitrary viewpoint/out-of-focus image generation program as real number data. In addition, since the fixed-pattern noise reduction process is realized by the image processing apparatus 110, it is assumed that the fixed-pattern noise reduction process is performed using a program mounted in a computer-executable form.

(Regarding Out-of-Focus Image Group Used in Present Embodiment)

The present embodiment assumes that an out-of-focus image group is constituted by M number of images, each image having N number of vertical pixels and N number of horizontal pixels. (Although an example in which the numbers of vertical and horizontal pixels are the same will be described in the present embodiment for the sake of simplicity, the methods according to the present embodiment are also applicable to images in which numbers of vertical and horizontal pixels do not match).

An out-of-focus image group to which fixed-pattern noise of an image sensor has been added during imaging is represented by the following expression.

$$y_k \in \mathbb{R}^{N \times N} (k=1, M)$$

where $\mathbb{R}^{N \times N}$ denotes an N-row, N-column matrix composed of real number elements. A subscript k denotes a number of an image constituting the out-of-focus image group and corresponds to a focusing position. An image $y_k$ that constitutes the out-of-focus image group may be an output signal itself (including a signal representing values of a plurality of cells which have been added by a binning process). Alternatively, the image $y_k$ may be an image obtained by subjecting an output signal of the image sensor to a development process such as gradation transformation and interpolation in which correspondence with a cell of the image sensor is maintained. Hereinafter, a value of a pixel of an image will be referred to as brightness.

An out-of-focus image group obtained by changing brightness in order to reduce fixed-pattern noise of an out-of-focus image group $y_k$ (k=1, M) is represented by the following expression.

$$x_k \in \mathbb{R}^{N \times N} (k=1,M)$$

In addition, an out-of-focus image group including only deterioration due to an optical blur of the imaging system is represented by the following expression.

$$o_k \in \mathbb{R}^{N \times N} (k=1,M)$$

Brightness of pixels at a j-th vertical and an i-th horizontal position of k-th images $y_k$ and $x_k$ constituting the out-of-focus image group is respectively represented by $(y_k)_{i,j}$ and $(x_k)_{i,j}$.

The present embodiment assumes that additive fixed-pattern noise $n \in \mathbb{R}^{N \times N}$ that is independent of an image component or a temporal change of an image of an object has been added to an out-of-focus image group $y_1, \ldots, y_M$. In other words, an out-of-focus image group $y_k$ can be expressed by the following expression.

$$y_k = o_k + n (k=1,M)$$

While a value $(n)_{i,j}$ of fixed-pattern noise n at each pixel (i,j) is attributable to various manufacturing errors of an image sensor, the present embodiment treats $(n)_{i,j}$ on the assumption that an occurrence frequency distribution of $(n)_{i,j}$ conforms to a normal distribution with an average of 0 and a standard deviation of σ. However, even if the occurrence frequency distribution of a value of each element of the fixed-pattern noise n does not conform to a normal distribution, fixed-pattern noise can be reduced with the method according to the present embodiment.

(Regarding Metrics Representing Smoothness of Image)

In the present embodiment, metrics representing smoothness of an image is used as metrics for evaluating whether or not fixed-pattern noise included in the image has been reduced. The smoothness of an image need only be quantitatively expressed by a numerical value. For example, a sum of information on non-smooth portions of an image or, in other words, metrics obtained by integrating an intensity of an edge, a texture, noise, and the like by the entire image may be used. In this case, the metrics indicate that, the smaller the value thereof, the smoother the image. Total variation (or TV) is known as metrics representing a smoothness of an image. A total variation is obtained by integrating an absolute value of a differential of brightness of each pixel in an image and is represented by the following expressions.

$$TV(u) = \int_\Omega |\nabla u| dx dy \quad (2)$$

$$|\nabla u| = \sqrt{(\partial u/\partial x)^2 + (\partial u/\partial y)^2} \quad (3)$$

where Ω denotes an integration target region, u denotes a function related to x, y, and dx and dy denote infinitesimal sections.

The total variation defined as described above takes a smaller value in a flat region with a smaller amount of change in an image and takes a large value in a region with a large amount of change in which a texture or noise is present. In other words, the smaller the total variation, the smoother the image. Therefore, a total variation is used in a form of total variation minimization in an optimization problem for reducing noise in an image and smoothing the image. When an image is discrete digital data, since a differential of brightness is represented by a difference in brightness between adjacent pixels, a total variation can be defined by a sum of absolute values of differences in brightness between adjacent pixels as presented below.

$$TV(u) = \sum_{i,j} \sqrt{|u_{i+1,j} - u_{i,j}|^2 + |u_{i,j+1} - u_{i,j}|^2} \quad (4)$$

(Concept of Fixed-Pattern Noise Reduction)

Figure 4A:
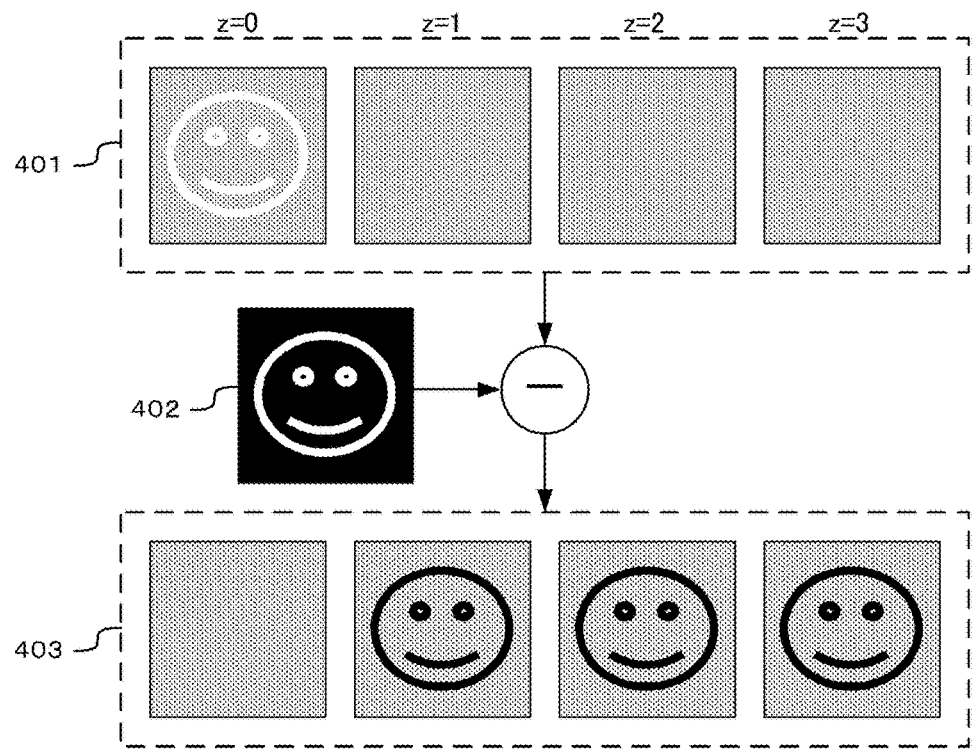
FIGS. 4A and 4B are diagrams for explaining a concept of fixed-pattern noise reduction.
Figure 4B:
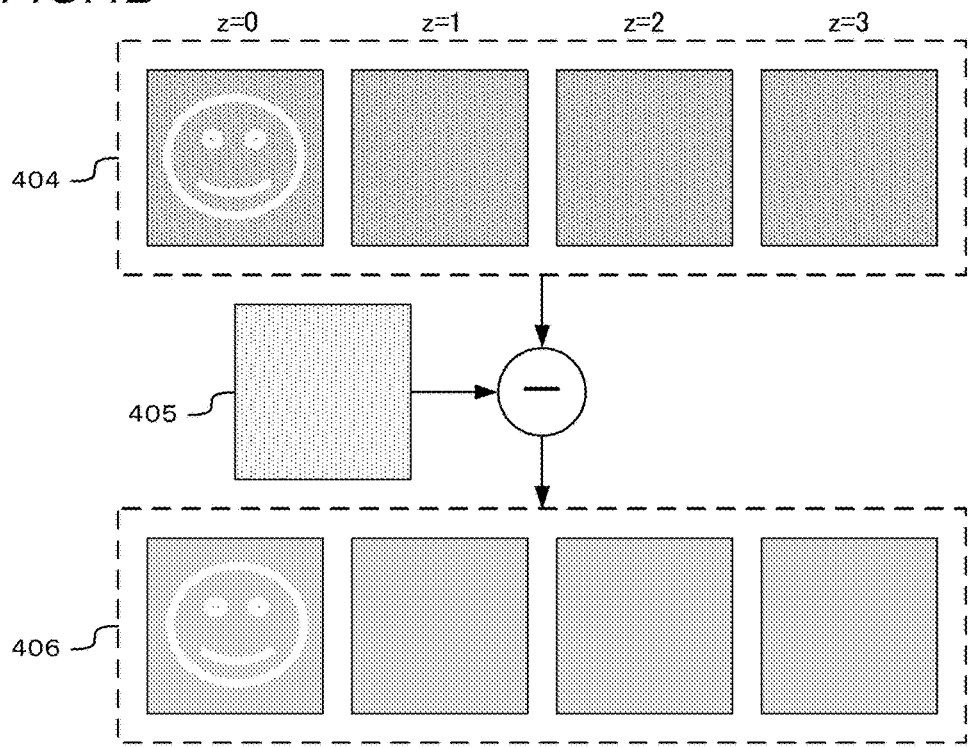

FIGS. 4A and 4B are diagrams for explaining a concept of fixed-pattern noise reduction according to the present embodiment. Reference numerals 401 and 404 denote examples of out-of-focus image groups constituted by four images photographed by changing focusing positions. Images with focusing positions z=0, 1, 2, and 3 are arranged left to right. A hatching applied to each image indicates a situation where the same fixed-pattern noise has been added to each image. The out-of-focus image groups 401 and 404 are constituted by a small number of images with high sharpness which represent an in-focus position (the image of z=0) and a relatively large number of smooth, out-of-focus images (the three images of z=1, 2, and 3). (Although not depicted in FIG. 4A, the object which is in focus at z=0 gradually blurs as the object moves away from the in-focus position).

Since pixels at the same position in respective images of an out-of-focus image group (referred to as corresponding pixels) have brightness based on data acquired at the same cell of an image sensor, the corresponding pixels include common fixed-pattern noise (noise attributable to the same cell in the image sensor). Therefore, reducing fixed-pattern noise under a condition of performing common brightness change with respect to the corresponding pixels of the respective image will be considered. However, since it is unclear as to how much fixed-pattern noise is added to which position (pixel) in an image, an optimal solution of brightness change for each position (each pixel) in the image is favorably determined under the condition described above so that image quality of the out-of-focus image group improves overall. At this point, attention is given to metrics representing a smoothness of the entire out-of-focus image group as metrics for evaluating whether or not the image quality of the out-of-focus image group has improved overall.

FIG. 4A shows an example in which a brightness component that is not fixed-pattern noise is reduced from each image of an out-of-focus image group. Reference numeral 402 denotes a brightness component that is not fixed-pattern noise or, in other words, an image component of an object (for example, a texture). Reference numeral 403 denotes an out-of-focus image group obtained by subtracting the image component 402 from each image constituting the out-of-focus image group 401. Focusing attention on an image of z=0 of the out-of-focus image group 403, the smoothness of the image has improved in accordance with the absence of the image component of the object. However, with respect to images of z=1 to 3 of the out-of-focus image group 401 which have been smooth due to focus blur, a texture is conversely created and smoothness of the images declines as shown by z=1 to 3 of the out-of-focus image group 403.

Therefore, with the entire out-of-focus image group, the decline in smoothness of the large number of images indicated by z=1 to 3 becomes more dominant than the improvement in smoothness of the small number of images of z=0. As a result, when assessed over the entire out-of-focus image group, smoothness declines.

FIG. 4B shows an example in which a brightness component that corresponds to fixed-pattern noise is reduced from each image of an out-of-focus image group. Reference numeral 405 denotes fixed-pattern noise included in the out-of-focus image group 404. Reference numeral 406 denotes an out-of-focus image group obtained by subtracting the image component 405 from all images constituting the out-of-focus image group 404. As shown in FIG. 4B, since smoothness improves due to cancellation of fixed-pattern noise in all images of z=0 to 3, the smoothness of the entire out-of-focus image group 406 improves. Even if intensity of the fixed-pattern noise is low, smoothness improves with respect to the entire out-of-focus image group.

As described earlier, a smoothness of an entire out-of-focus image group can be assessed by, for example, a smallness of a total variation of the entire out-of-focus image group. Therefore, favorably, optimization which maximizes a smoothness of an entire out-of-focus image group is performed under a condition that common brightness change is performed with respect to corresponding pixels in respective images constituting the out-of-focus image group or, in other words, a total variation minimization of the entire out-of-focus image group is performed. Accordingly, fixed-pattern noise can be reduced while maintaining an image of an object (such as a texture) which is included in an out-of-focus image group. For this reason, in the present embodiment, formulating the process described above as an optimization problem will be considered.

Moreover, "common brightness change" refers to performing an addition, a subtraction, a multiplication, or a division of a same value with respect to brightness of a corresponding pixel of each image or a value obtained by applying gradation transformation to the brightness. In the case of additive fixed-pattern noise, a same value (a correction amount) may be added to or subtracted from brightness of a corresponding pixel of each image, and in the case of multiplicative fixed-pattern noise to be described in a subsequent embodiment, brightness of a corresponding pixel of each image may be multiplied or divided by a same value (a correction coefficient). Furthermore, in the case of fixed-pattern noises other than additive and multiplicative fixed-pattern noises to be described later, correction can be performed by multiplying a value obtained by gradation transformation of brightness of a corresponding pixel of each pixel by a same value (a correction coefficient) and subsequently subtracting the value (the correction coefficient).

(Regarding Mathematical Expressions and Symbols)

Mathematical expressions and symbols used in the present embodiment will be explained before formulation as an optimization problem.

When a vector x is represented by $x=(x_1, x_2, \ldots, x_N)$, an L1 norm and an L2 norm of the vector x are defined by the following expressions.

$$\|x\|_1 := \sum_{i=1}^{N} |x_i|$$

$$\|x\|_1 := \sqrt{\sum_{i=1}^{N} |x_i|^2}$$

In addition, in the present embodiment, an L1 norm and an L2 norm with respect to image data (matrix) $u \in R^{N \times N}$ are defined as follows.

$$\|u\|_1 := \sum_{i,j=1}^{N} |u_{i,j}|$$

$$\|u\|_2 := \sqrt{\sum_{i,j=1}^{N} |u_{i,j}|^2}$$

Furthermore, a total variation with respect to the image data $u \in R^{N \times N}$ is expressed by a TV norm represented by expression (5).

$$\|u\|_{TV} := \sum_{i,j}^{N} |(\nabla u)_{i,j}| = \sum_{i,j}^{N} \sqrt{(\partial u/\partial x)_{i,j}^2 + (\partial u/\partial y)_{i,j}^2} = \|\nabla u\|_1 \quad (5)$$

In expression (5), $(\nabla u)_{i,j}$ denotes a vector composed of partial differentiations in the horizontal (x) direction and the vertical (y) direction which satisfies the following expression.

$$(\nabla u)_{i,j} = ((\partial u/\partial x)_{i,j}, (\partial u/\partial y)_{i,j})$$

A norm with respect to the image data described above is equivalent to a norm with respect to a vector expressed as $$u_v = vec[u] \in \mathbb{R}^{N^2}$$

which is determined by performing a vector representation involving transposing respective row vectors of the image data $u \in R^{N \times N}$ and arranging the transposed row vectors in a column direction. Moreover, vec [.] denotes an operation of a vector representation involving rearranging a matrix.

Next, an expression used in a formulation of an optimization problem will be described. Expression (6) represents an example of a formulation of an optimization problem.

$$x^{(*)} = \arg\min_{x} f(x) \text{ s.t. } 0 \le x \le 255 \quad (6)$$

In the expression above, argmin signifies determining a value of a variable x that minimizes a function f(x). The function f(x) that is a target of minimization is referred to as an objective function. "s.t." is an abbreviation of "subject to" and is followed by a description of a condition to be satisfied by the solution x (in expression (6), $0 \le x \le 255$). The condition described after s.t. is referred to as a constraint. $x^{(*)}$ on the left side of expression (6) denotes a value of x which minimizes the objective function f(x) and which is determined by varying the value of x within a range where the constraint is satisfied.

In the present embodiment, when solving the optimization problem described above, for convenience of calculation, an operation of integrating a plurality of images of an out-of-focus image group is performed to generate a single integrated image and an optimization process is applied to the integrated image. Hereinafter, a single image generated by the operation described above will be referred to as a spread image. In addition, an operation of determining an out-of-focus image group constituted by a plurality of original images from a spread image in which fixed-pattern noise has been reduced is also performed after the optimization process. Therefore, an operation of generating a spread image from an out-of-focus image group and an operation of generating an out-of-focus image group from a spread image will be described.

An operation T is an operation of integrating a plurality of images constituting an out-of-focus image group to generate a single image. With an out-of-focus image group $y_1, \ldots, y_M$ constituted by M number of images as an input, the operation T of generating a spread image g is expressed as follows.

$$T[y_1, \ldots, y_M] = g \qquad (7)$$

While various operations may be available as the operation T, one example is an operation as expressed below in which a plurality of images set as arguments are sequentially coupled in a column direction.

$$g = (y_1^T \ldots y_M^T)^T \in \mathbb{R}^{NM \times N} \qquad (8)$$

(where T at top-right of the matrix denotes matrix transposition)

In this case, the following relationship exists between elements of the original images $y_1, \ldots, y_M$ and elements of the spread image g which represents an output.

$$(g)_{i,j+(k-1)N} = (y_k)_{i,j}, i,j \in \{1, \ldots, N\}, k \in \{1, \ldots, M\} \qquad (9)$$

Next, the operation T and an operation E that is an inverse operation thereof will be described. The operation E is an operation of determining an k-th image $y_k$ constituting an out-of-focus image group from the spread image g and is expressed as follows.

$$E[g,k] = y_k \qquad (10)$$

An M-dimensional vector obtained by sequentially arranging brightness of corresponding pixels (i,j) of respective images $y_1, \ldots, y_M$ which constitute an out-of-focus image group from k=1 to M is defined as a pixel vector of a pixel (i,j). For example, a pixel vector of the pixel (i,j) of the out-of-focus image group $y_1, \ldots, y_M$ is expressed by the following expression.

$$((y_1)_{i,j}, \ldots, (y_M)_{i,j}) \in \mathbb{R}^M$$

When an operation of generating a pixel vector from the spread image g generated from the out-of-focus image group $y_1, \ldots, y_M$ using the operation T is denoted by an operation V, the operation V is expressed as follows.

$$g_{[i,j]} = V[g,(i,j)] \qquad (11)$$

where $g_{[i,j]}$ on the left side of expression (11) denotes a pixel vector and is expressed as follows.

$$g_{[i,j]} = ((y_1)_{i,j}, \ldots, (y_M)_{i,j}) \in \mathbb{R}^M$$

Modifications of the operation T include a method of coupling respective images constituting an out-of-focus image group in a row direction and a method of respectively coupling a predetermined number of images in the row and column directions. In addition, a region where all brightness is 0 or a region with reduced brightness change may be inserted as a buffer region in a boundary section when coupling the respective images. In this case, operations of the operation E and the operation V also change in correspondence to the operation T. In the present embodiment, a case where a coupling method represented by expression (8) is performed as the operation T will be described.

In addition, an image after brightness change must fall within a same brightness range (for example, 0 to 255) as an original image. A closed convex set representing a brightness range of 0 to 255 is denoted by $C_{255}$ as follows.

$$C_{255} := \{x \in \mathbb{R}^{N \times N} | x_{i,j} \in [0,255] (i,j=1, \ldots, N)\}$$

(Formulation of Optimization Problem)

The problem of reducing fixed-pattern noise in the out-of-focus image group described with reference to FIG. 4B can be formulated as the following optimization problem.

$$x_k^{(*)} = \arg\min_{x_1, \ldots, x_M} \|T[x_1, \ldots, x_N]\|_{TV} \qquad (12)$$

$$\text{s.t.} \begin{cases} x_k \in C_{255}, & \forall k \in \{1, \ldots, M\} \\ x_k - y_k = x_1 - y_1, & \forall k \in \{1, \ldots, M\} \\ \|T[x_1, \ldots, x_N] - T[y_1, \ldots, y_N]\|_2 \le \varepsilon \end{cases}$$

Here, $x^{(*)}$ is to be determined for all k=1, . . . , M.

Next, an objective function and a constraint of the optimization problem formulated by expression (12) will be described in detail.

(Objective Function)

The objective function expressed by Expression (12) represents a TV norm with respect to a single spread image constituted by M number of images constituting an out-of-focus image group. Meanwhile, in order to reduce the effect of fixed-pattern noise in an all-in-focus image, as shown in FIG. 4B, respective TV norms of the M number of images constituting the out-of-focus image group must be reduced. However, the TV norm with respect to the spread image and a sum of TV norms of the respective images constituting the out-of-focus image group are equal with the exception of a slight difference at a boundary which occurs when arranging the images. Therefore, minimizing the TV norm with respect to the spread image by the objective function expressed by Expression (12) is substantially equivalent to minimizing, as a whole, the TV norms of the M number of images constituting the original out-of-focus image group.

(Constraint)

Among the three constraints in Expression (12), a first constraint is a general constraint in an image recovery process which represents that brightness of each image constituting an out-of-focus image group after brightness change falls within a range of 0 to 255.

A second constraint represents that, for any image number k, a difference between an image $y_k$ prior to brightness change and an image $x_k$ after the brightness change is the same. As described with reference to FIG. 4B, in the case of additive fixed-pattern noise attributable to an image sensor, a noise component included in the image $y_k$ is the same regardless of a focusing position (k). Therefore, by applying the second constraint, an additive fixed-pattern noise component that is equally superimposed on all images $y_1, \ldots, y_k$ can be removed.

Representing the second constraint by a condition for each pixel will be considered. An M-dimensional vector constituted by elements that are all 1 is set as follows as a direction vector d.

$$d = (1, \ldots, 1) \in \mathbb{R}^M \qquad (13)$$

Next, pixel vectors of respective pixels (i,j) are determined from an out-of-focus image group $y_1, \ldots, y_M$ at the time of photography and an out-of-focus image group $x_1, \ldots, x_M$ after brightness change, whereby a difference $u_{[i,j]}$ of the pixels (i,j) is expressed as follows.

$$u_{[i,j]} = ((x_1)_{i,j} - (y_1)_{i,j}, \ldots, (x_M)_{i,j} - (y_M)_{i,j})$$

Since $u_{[i,j]}$ is a pixel vector representing an amount of correction from an original pixel vector, u [i,j] will be subsequently referred to as a pixel correction vector.

Due to the second constraint, each element of the pixel correction vector $u_{[i,j]}$ always takes an equal value. Therefore, the pixel correction vector is expressed as follows.

$$u_{[i,j]} = c_{i,j} \cdot d$$

(where $c_{i,j}$ denotes a real number which differs for each pixel). In other words, the pixel correction vector $u_{[i,j]}$ and the direction vector d are parallel to each other. In addition, when fixed-pattern noise can be completely removed, $c_{i,j}$ equals a value obtained by multiplying fixed-pattern noise $(n)_{i,j}$ added to each pixel by −1.

A third constraint of the Expression (12) indicates that an L2 norm of a difference between a spread image T $[y_1, \ldots, y_N]$ generated from an original out-of-focus image group and a spread image T $[x_1, \ldots, x_N]$ after brightness change is equal to or smaller than ε. In other words, ε is a constant that defines an upper limit value of an amount of brightness change, and the third constraint represents a condition that prevents an amount of brightness change (a total amount) between the spread image T $[y_1, \ldots, y_N]$ and the spread image T $[x_1, \ldots, x_N]$ from exceeding a prescribed value (ε). This condition is more relaxed than a constraint expressed by $$\|x_k - y_k\|_2 \leq \varepsilon_1, \forall k \in \{1, \ldots, M\} \quad (14)$$

which causes, for each image constituting an out-of-focus image group, an L2 norm of a difference between an original image and an image after brightness change to be equal to or smaller than a prescribed value (ε1). However, since the second constraint (a condition due to a pixel vector) is in place, significantly biased brightness change is not permitted for a specific image $x_k$.

Moreover, when the fixed-pattern noise $n \in R^{N \times N}$ is Gaussian noise in which an occurrence frequency distribution of each brightness value conforms to a normal distribution with an average of 0 and a standard deviation of σ, the L2 norm of the fixed-pattern noise n is expressed as follows.

$$\|n\|_2 = N\sigma$$

Therefore, when the standard deviation σ of the fixed-pattern noise is known, with the third constraint of the Expression (12), appropriate noise reduction in which excessive brightness changes are suppressed can be realized by setting ε as follows.

$$\varepsilon = (N\sqrt{M})\sigma$$

Moreover, $\varepsilon_1$ in Expression (14) satisfies $\varepsilon_1 = N_\sigma$.

By denoting a spread image generated by the operation T from the original out-of-focus image group $y_1, \ldots, y_M$ as g and a spread image generated by the operation T from an out-of-focus image group $x_1, \ldots, x_M$ after brightness change as f, and by arranging Expression (12), the following Expressions (15) and (16) are obtained.

$$f^{(*)} = \underset{f}{\operatorname{argmin}} \|f\|_{TV} \text{ s.t.} \begin{cases} f \in C_{255,M} \\ (f_{[i,j]} - g_{[i,j]}) \| d, \forall i, j \in \{1, \ldots, N\} \\ \|f - g\|_2 \leq \varepsilon \end{cases} \quad (15)$$

$$x_k^{(*)} = E[f^{(*)}, k] \quad (16)$$

In other words, formulation can be performed as an optimization problem of determining, from the spread image g, a spread image $f^{(*)}$ from which fixed-pattern noise is removed. However, as presented below, a closed convex set $C_{255,M}$ is to be a condition that an element of the spread image f after brightness change does not have a solution outside of the range of [0, 255].

$$C_{255,M} := \{x \in \mathbb{R}^{NM \times N} | x_{i,j} \in [0,255] (i=1, \ldots, N, j=1, \ldots, NM)\}$$

The pixel vectors $f_{[i,j]}$ and $g_{[i,j]}$ in the second constraint of Expression (15) can be respectively determined by the following expressions.

$$f_{[i,j]} = V[f, (i,j)]$$

$$g_{[i,j]} = V[g, (i,j)]$$

The second constraint of Expression (15) represents a condition that a pixel correction vector ($f_{[i,j]} - g_{[i,j]}$) of an arbitrary pixel (i,j) is parallel to the direction vector d. "∥" is a symbol denoting parallelism.

In order to make an optimization algorithm more readily applicable, Expression (15) is modified as expressed by Expression (17).

$$f^{(*)} = \underset{f}{\operatorname{argmin}}(\|\nabla f\|_1 + I(f)) \quad (17)$$

$$\text{s.t.} \begin{cases} (f_{[i,j]} - g_{[i,j]}) \| d, \forall i, j \in \{1, \ldots, N\} \\ \|f - g\|_2 \leq \varepsilon \end{cases}$$

I(f) in Expression (17) denotes an indicator function of the closed convex set $C_{255,M}$. When an element of f is within the range of [0, 255], I(f) is 0, and when an element of f is outside of the range of [0, 255], I(f) is ∞ (infinity). In addition, hereinafter, a first constraint of Expression (17) will be referred to as a constraint C1 and a second constraint of Expression (17) will be referred to as a constraint C2.

Although details will be given later, an optimization problem formulated by Expressions (15) and (17) becomes a convex optimization problem. A convex optimization problem is an optimization problem of which an objective function is a convex function and a constraint is a closed convex set and of which an optimal solution is guaranteed to be a global optimum solution, and is a readily-handled optimization problem which produces the global optimal solution regardless of a supplied initial value.

One algorithm for solving an optimization problem is an iterative method. The iterative method is a method of determining an approximate solution by an iterative calculation formula based on an initial value and subsequently repeating a calculation of determining an approximate solution using the iterative calculation formula until an iteration end condition is satisfied in order to increase accuracy of an approximate solution. In other words, an iterative calculation formula can be derived by applying an iterative method to a convex optimization problem formulated by Expressions (15) and (17), and a highly accurate approximate solution can be determined by repetitively performing iterative calculations. The iterative calculation formula is dependent on the optimization algorithm to be applied.

At this point, by appropriately setting parameters of the optimization algorithm, the approximate solution converges to a minimum (or maximum) value of the objective function as the number of iterations n increases. Various criteria can be used as convergence determination criteria with respect to a solution. For example, an L2 norm of a difference in approximate solutions before and after an iterative calculation $$\|f^{(n+1)} - f^{(n)}\|_2$$

or grading on a curve $$\|f^{(n+1)} - f^{(n)}\|_2 / \|f^{(n)}\|_2$$

or the like can be used as convergence determination criteria. In this case, $f^{(n)}$ denotes an approximate solution with respect to the number of iterations n.

Next, a convex function, a convex set, and a metric projection (convex projection) which are basic terms related to a convex optimization problem will be described.

(Convex Function)

When arbitrary $x, y \in R^N$ and $\lambda \in [0,1]$ always satisfy $$f(\lambda x + (1-\lambda) y) \le \lambda f(x) + (1-\lambda) f(y),$$

$f(x)$ is referred to as a convex function on $R^N$. In other words, a function such that a line segment connecting two arbitrary points on $f(x)$ is always on an upper side of $f(x)$ is a convex function. Moreover, the objective function of Expression (17) is a convex function and the two expressions constituting the objective function are both convex functions.

(Convex Set)

When C denotes a subset of $R^N$, if $$\lambda x + (1-\lambda) y \in C$$

is satisfied with respect to all $x, y \in C$ and all $\lambda \in [0,1]$, then C is a convex set. In other words, this represents that each point on a line segment connecting x and y inevitably belongs to C. In addition, when the convex set C is a closed set, C is referred to as a closed convex set.

A set $C_1$ satisfying the constraint C1 in Expression (17) is a closed convex set due to the reasons given below. Specifically, when a set that can be taken by a pixel vector of a pixel (i,j) is denoted by $C_{1(i,j)}$, the constraint C1 can be expressed by a straight line on the direction vector d. Since each point on a line segment connecting two arbitrary points inevitably belongs to the line segment, $C_{1(i,j)}$ is a closed convex set and $C_1$ which is a Cartesian product thereof is also a closed convex set.

In addition, a set $C_2$ satisfying the constraint C2 is also a closed convex set.

(Metric Projection)

In a convex optimization problem, a map referred to as a metric projection is applied in order to determine a solution satisfying a constraint. With respect to a non-empty closed convex set $C \subset R^N$ and an arbitrary $x \in R^N$, a metric projection represents a map on which exists a single point $P_C(x) \in C$ satisfying $$\|x - P_C(x)\| = \min_{z \in C} \|x - z\|$$

and which associates $P_C(x)$ with x. In other words, a metric projection is a map which, when C is a closed convex set, maps $x \in R^N$ to z which is on the closed convex set C and which is at a shortest distance.

(Fixed-Pattern Noise Reduction Process)

Before describing details of a method of determining an approximate solution using the iterative method, an overall summary of a fixed-pattern noise reduction process which is a process for reducing fixed-pattern noise in an out-of-focus image group according to the present embodiment will be given.

Figure 5:
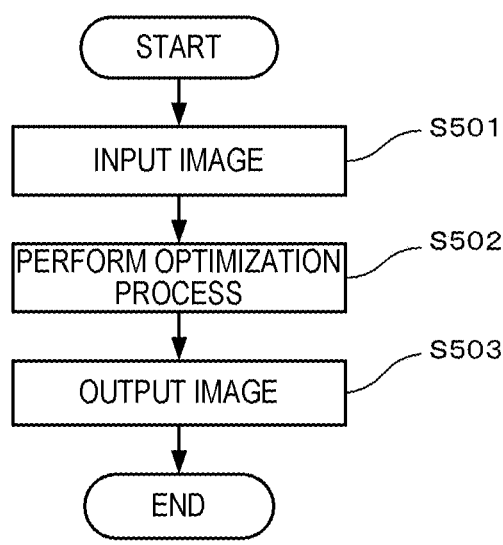
FIG. 5 is a flow chart showing a fixed-pattern noise reduction process according to a first embodiment.

FIG. 5 shows a processing flow of the fixed-pattern noise reduction process according to the present embodiment. The fixed-pattern noise reduction process is mounted as a program that can be executed by the image processing apparatus 110, and the image processing apparatus 110 can acquire an out-of-focus image group $y_k$ (k=1, . . . , M) from the imaging apparatus 120, the storage apparatus 113, or the other computer system 114.

First, in an image input step S501, the image processing apparatus 110 acquires the out-of-focus image group $y_k$ (k=1, . . . , M) as an input image and generates a spread image g using the operation T described earlier. Next, in an optimization process step S502, the image processing apparatus 110 determines a spread image $f^{(*)}$ in which fixed-pattern noise has been reduced using an iterative calculation formula determined by applying an optimization algorithm to the optimization problem formulated by Expression (17). Details will be provided later. The calculation of step S502 is performed by the CPU 301 or performed with an arithmetic unit using a GPU or with dedicated calculation hardware (not illustrated), and a result thereof is output to the RAM 302.

Subsequently, in an image output step S503, the image processing apparatus 110 uses an operation E as expressed in Expression (16) to generate an out-of-focus image group $x_1^{(*)}, \ldots, x_k^{(*)}$ from the spread image $f^{(*)}$ in which fixed-pattern noise has been reduced. The out-of-focus image group $x_1^{(*)}, \ldots, x_k^{(*)}$ having fixed-pattern noise reduced in this manner is output to the RAM 302, the storage apparatus 113, or the other computer system 114 as an output image.

(Processing Flow Upon Application of Optimization Algorithm)

Figure 6:
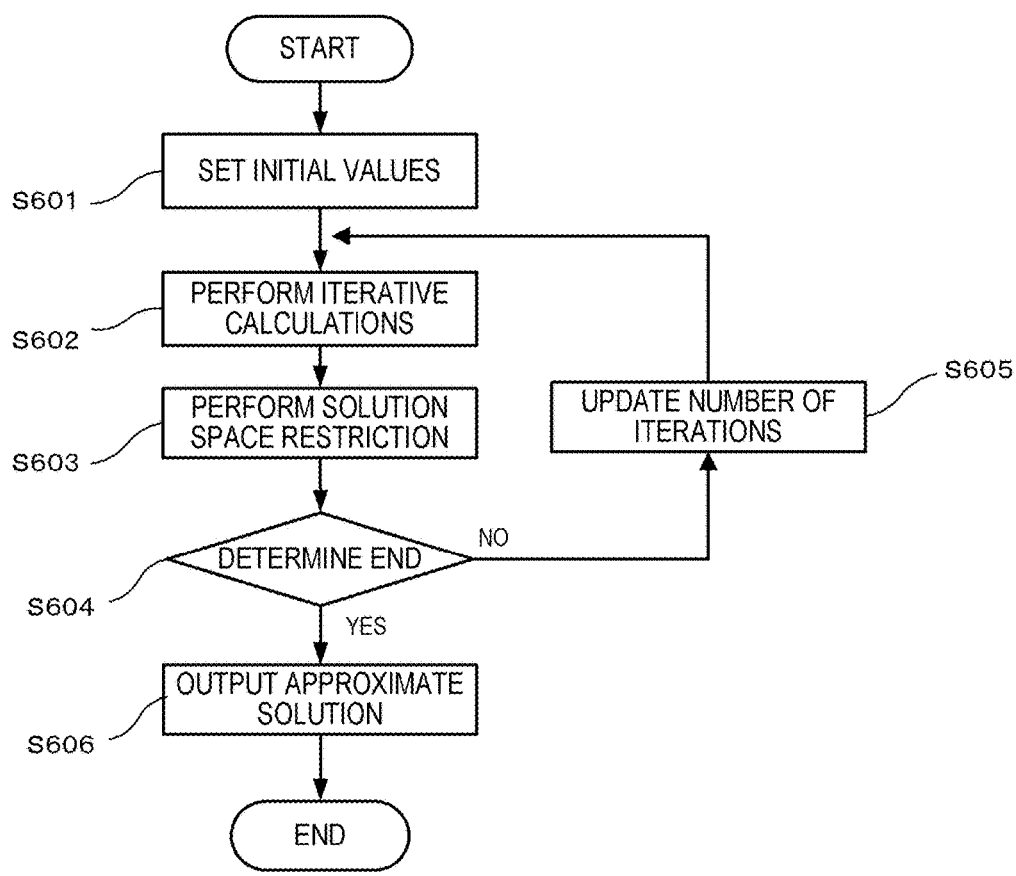
FIG. 6 is a flow chart showing internal processing of an optimization process step S502.

FIG. 6 is a flow chart showing internal processing of the optimization process step S502.

First, in an initial value setting step S601, the image processing apparatus 110 sets initial values and parameters to be used in subsequent calculations. Specifically, an initial value and a parameter of an optimization algorithm which are used in step S602, values of the direction vector d and ε which are used in step S603, an upper limit value $n_{max}$ of the number of iterations and a threshold $e_{th}$ of convergence determination criteria to a solution which are used in step S604 are set. In addition, n=0 is set as an initial value of a counter of the number of iterations n.

In the iterative calculation step S602, the image processing apparatus 110 determines an approximate solution $f^{(n+1)}$ from an approximate solution $f^{(n)}$ using an iterative calculation formula determined by applying an optimization algorithm. However, in the case of n=0, the initial value given in the initial value setting step S601 is used as an approximate solution $f^{(0)}$.

In a solution space restriction step S603, the image processing apparatus 110 performs a process referred to as a metric projection (a convex projection) for each constraint so that the approximate solution $f^{(n+1)}$ determined in step S602 satisfies the constraint, and changes the approximate solution $f^{(n+1)}$. Simply put, when an approximate solution falls outside of a solution space defined by a constraint, a process for restoring the approximate solution to the solution space is performed. Details will be provided later.

In an end determination step S604, the image processing apparatus 110 determines whether or not to end the iterative process. Specifically, the image processing apparatus 110 determines whether or not the number of iterations n has reached the upper limit value $n_{max}$ set in step S601. Next, the image processing apparatus 110 calculates convergence determination criteria to a solution (for example, an L2 norm of a difference between approximate solutions before and after the iterative calculations described earlier) and determines whether the convergence determination criteria falls below the threshold $e_{th}$ set in step S601. When neither of the two determination conditions has been satisfied, the image processing apparatus 110 proceeds to an iteration count update step S605 and adds 1 to the current number of iterations n, and once again returns to the iterative calculation step S602. When any one of the determination conditions is satisfied, the image processing apparatus 110 proceeds to an approximate solution output step S606. In the approximate solution output step S606, the image processing apparatus 110 sets the approximate solution $f^{(n+1)}$ determined in the last step S603 to an optimal solution or, in other words, the spread image $f^{(*)}$ and ends the optimization process step S502.

(Regarding Constraint C1)

Figure 8A:
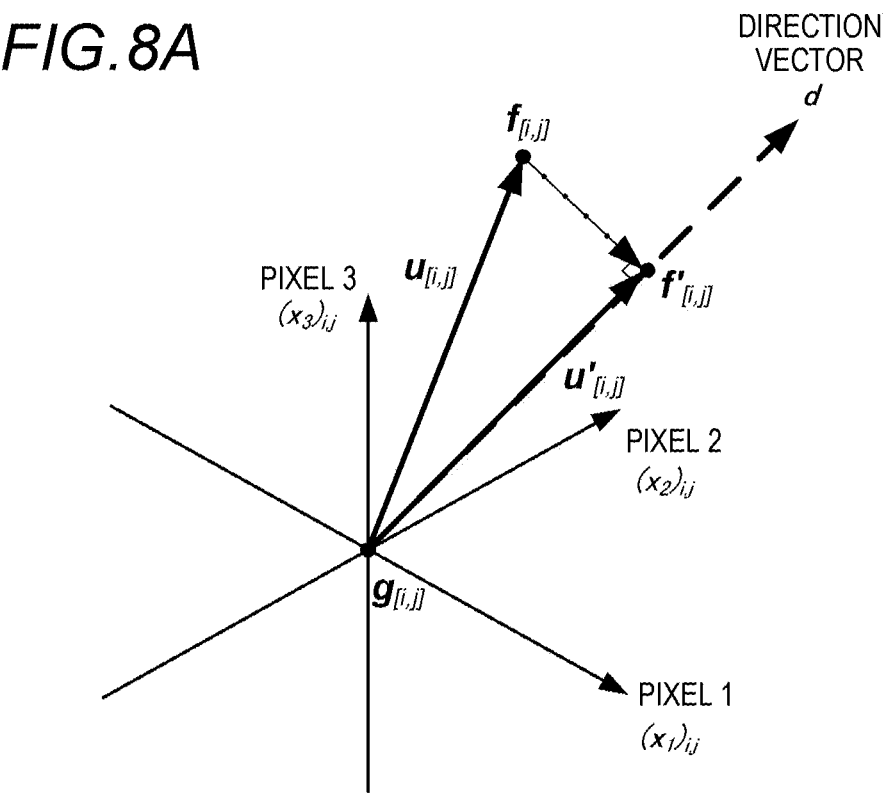
FIGS. 8A and 8B are diagrams for explaining the meanings represented by constraints C1 and C2.

The meaning represented by the constraint C1 will now be described with reference to FIG. 8A. FIG. 8A is a diagram showing the constraint C1 or, in other words, a restriction of a solution space imposed by the following expression.

$$(f_{[i,j]} - g_{[i,j]}) \| d, \quad \forall i,j \in \{1, \ldots, N\}$$

This represents a condition that a pixel correction vector $u_{[i,j]} = f_{[i,j]} - g_{[i,j]}$ at an arbitrary pixel position is parallel to the direction vector d.

As an example, an out-of-focus image group constituted by three images is assumed. FIG. 8A represents a three-dimensional solution space in which a pixel vector $f_{[i,j]}$ determined from a spread image f may exist and which has a pixel vector $g_{[i,j]}$ at a pixel position (i,j) determined from a spread image g generated from an original out-of-focus image group $y_1, y_2, y_3$ as its origin, where $f_{[i,j]} = ((x_1)_{i,j}, (x_2)_{i,j}, (x_3)_{i,j})$. When the number of images constituting the out-of-focus image group is M, the solution space has M dimensions. A dashed line represents the direction vector d=(1, 1, 1).

When the constraint C1 does not exist, the pixel correction vector $u_{[i,j]} = f_{[i,j]} - g_{[i,j]}$ may assume various directions. However, when the constraint C1 exists, the pixel correction vector $u_{[i,j]}$ must be parallel to the direction vector d or, in other words, a real number multiple of the direction vector d. The pixel vector $f_{[i,j]}$ is changed to $f'_{[i,j]}$ so as to satisfy the constraint C1.

A pixel correction vector $u_{[i,j]}$ which minimizes a distance between the pixel vector $f_{[i,j]}$ prior to the change and the pixel vector $f'_{[i,j]}$ after the change can be calculated using the following expression of orthogonal projection (orthographic projection) of a vector.

$$u'_{[i,j]} = \frac{\langle u_{[i,j]}, d \rangle}{\|d\|_2^2} d \tag{18}$$

where <. , .> denotes an inner product of vectors.

As expressed by Expression (19), the pixel vector $f'_{[i,j]}$ satisfying the constraint C1 can be generated by an addition of an pixel correction vector $u'_{[i,j]}$ and the pixel vector $g_{[i,j]}$.

$$f'_{[i,j]} = u'_{[i,j]} + g_{[i,j]} \tag{19}$$

However, the calculations of Expressions (18) and (19) must be performed for all pixels (i,j).

(Regarding Constraint C2)

Figure 8B:
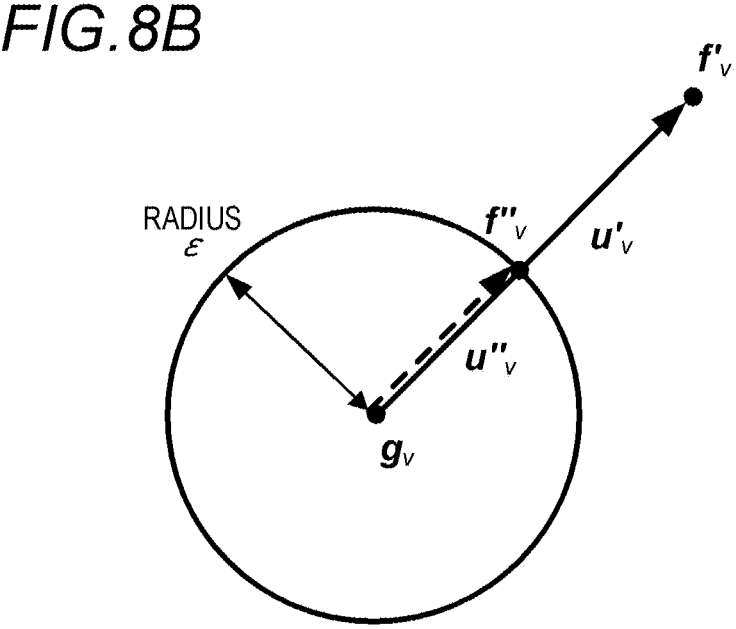

Next, the meaning represented by the constraint C2 will be described with reference to FIG. 8B. FIG. 8B is a diagram showing the constraint C2 or, in other words, a restriction of a solution space imposed by the following expression.

$$\|f - g\|_2 \leq \varepsilon$$

This is a condition that a total amount of brightness change with respect to an input image (the spread image g) is equal to or less than an upper limit value ε.

In FIG. 8B, $f'_v$ denotes a vector representation $f'_v = \text{vec}[f']$ of an approximate solution f' that satisfies a condition of a solution space due to the constraint C1, and $g_v$ denotes a vector representation $g_v = \text{vec}[g]$ of the spread image g. $u'_v$ denotes a difference between vectors $f'_v$ and $g_v$.

A range of $f'_v$ satisfying the constraint C2 is the inside of a multidimensional ($N^2M$-dimensional) hypersphere with a radius ε and with $g_v$ as its origin. As described earlier, a value of the radius ε is calculated from a standard deviation σ of fixed-pattern noise of an image sensor used in photography. The standard deviation σ of the fixed-pattern noise can be determined in advance by analyzing characteristics of the image sensor. Since additive fixed-pattern noise is assumed in the present embodiment, $$\varepsilon = (N\sqrt{M})\sigma$$

is adopted.

A metric projection to a closed convex set $C_2$ which satisfies the constraint C2 can be calculated by the following expressions.

$$f''_v = \text{Proj}_{C_2}(f'_v, g_v, \varepsilon) = g_v + \text{Ball}(f'_v - g_v, \varepsilon) \tag{20}$$

$$\text{Ball}(x, \varepsilon) = \begin{cases} x, & \text{if } \|x\|_2 \leq \varepsilon \\ \varepsilon \frac{x}{\|x\|_2}, & \text{otherwise} \end{cases} \tag{21}$$

In other words, $f'_v$ is projected to an intersection point $f''_v$ of a line segment connecting $f'_v$ and $g_v$ with the hypersphere with the radius ε only when $u'_v$ does not exist inside the hypersphere with the radius ε.

As shown in FIG. 8B, with a metric projection to the closed convex set $C_2$, directions of vectors do not change between $u'_v$ and $u''_v$ which represent before and after change. In other words, a direction of a pixel correction vector of each pixel determined by the constraint C1 does not change and remain parallel to the direction vector d, and constraints C1 and C2 are simultaneously satisfied.

(Solution Space Restriction Step S603)

Next, an internal processing flow of the solution space restriction step S603 will be described with reference to FIG. 7. Since the iterative calculation step S602 is performed earlier in the sequence of the flow chart shown in FIG. 6, the solution space restriction step S603 is a characteristic configuration of the present embodiment and therefore will be described first.

First, in a difference spread image calculation step S701, the image processing apparatus 110 calculates a difference spread image $u = f^{(n+1)} - g$ of an approximate solution $f^{(n+1)}$ and the spread image g. Next, in a constraint C1 application step S702, with respect to the difference spread image u calculated in S701, the image processing apparatus 110 performs a metric projection to a closed convex set $C_1$ so as to satisfy the constraint C1 and generates a difference spread image u'. Details will be provided later.

Next, in a constraint C2 application step S703, with respect to the difference spread image u' determined in S702, the image processing apparatus 110 performs a metric projection to a closed convex set $C_2$ so as to satisfy the constraint C2 and generates a difference spread image u". Details will be provided later.

Finally, in an approximate solution update step S704, the image processing apparatus 110 performs a calculation expressed by $$f''=g+u'' \quad (22)$$

to determine f" which satisfies the constraints C1 and C2 from the difference spread image u" determined in step S703 and the spread image g, and sets a value of f" to the approximate solution $f^{(n+1)}$.

Figure 7:
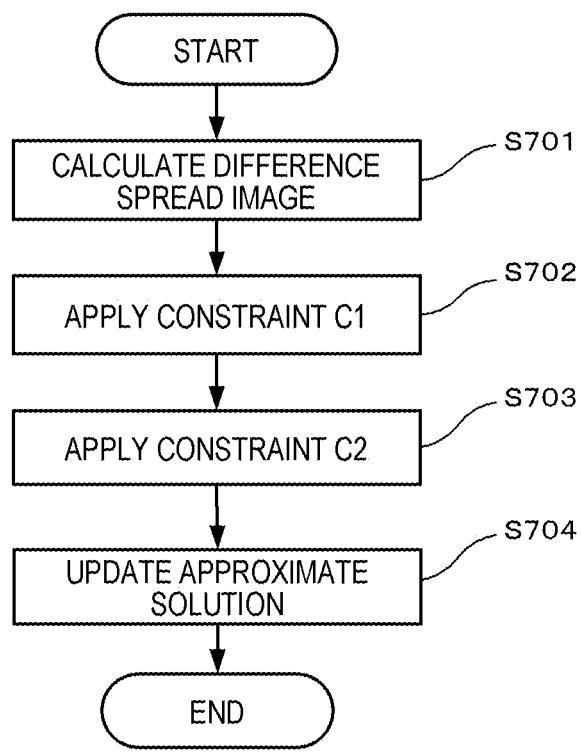
FIG. 7 is a flow chart showing internal processing of a solution space restriction step S603.

Moreover, while the difference spread image u is calculated first and, after applying two metric projections to the difference spread image u, an approximate solution $f^{(n+1)}$ after change is calculated from the difference spread image u" after change in FIG. 7, a processing sequence is not limited thereto. For example, a same result can be acquired by first determining a metric projection to the closed convex set $C_1$ and subsequently determining a metric projection to the closed convex set $C_2$ with respect to the approximate solution $f^{(n+1)}$ without calculating the difference spread image u.

(Constraint C1 Application Step S702)

Next, details of the constraint C1 application step S702 will be described. FIG. 9 is a flow chart showing internal processing of the constraint C1 application step S702. Pixel loops S901 and S906 represent loop end symbols and signify that processes of S902 to S905 are to be repeated until processing with respect to all pixel positions (i,j) are finished.

In a direction vector acquisition step S902, the image processing apparatus 110 acquires a direction vector d necessary for calculating Expression (18). As already described, in the present embodiment, the direction vector d is a vector with M number of elements which are all 1.

Next, in a pixel correction vector acquisition step S903, the image processing apparatus 110 performs an operation expressed by $$u_{[i,j]}=V[u,(i,j)]$$

to determine a pixel correction vector at a pixel position (i,j).

Subsequently, in an orthogonal projection calculation step S904, using Expression (18), the image processing apparatus 110 calculates an orthogonal projection vector $u'_{[i,j]}$ of the pixel correction vector $u_{[i,j]}$ with respect to the direction vector d. $u'_{[i,j]}$ is a real number multiple of the direction vector.

Next, in a difference spread image update step S905, by an inverse operation to the operation V, the calculated values of the pixel correction vector $u'_{[i,j]}$ are written to the difference spread image u'. Since a correspondence relationship expressed by $$u'_{[i,j]}=((u'_1)_{i,j}, \ldots ,(u'_M)_{i,j}) \quad (23)$$

$$(u')_{i,j+(k-1)N}=(u'_k)_{i,j}, \; i,j \in \{1, \ldots, N\}, \; k \in \{1, \ldots, M\} \quad (24)$$

exists between the difference spread image u' and the pixel correction vector $u'_{[i,j]}$ this is realized by an operation of writing data of a corresponding pixel correction vector $u'_{[i,j]}$ to a data region of the difference spread image u' having been secured in advance on the RAM 302.

In the pixel loop S906, a determination is made as to whether or not processing of all pixels has been finished. When processing of all pixels has been finished, the processing is ended. When processing of all pixels has not been finished, a return is made to S902 to repeat the processing.

(Constraint C2 Application Step S703)

Figure 10:
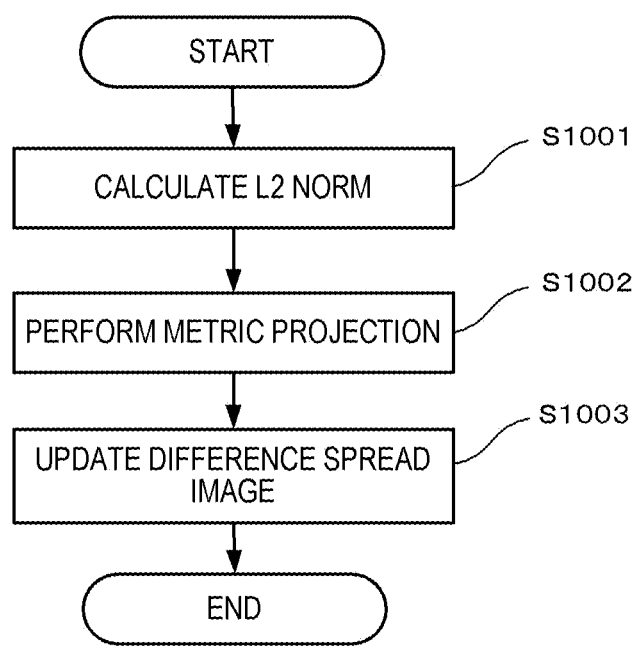
FIG. 10 is a flow chart showing internal processing of a constraint C2 application step S703.

Next, details of the constraint C2 application step S703 will be described. FIG. 10 is a flow chart showing internal processing of the constraint C2 application step S703.

First, in an L2 norm calculation step S1001, the image processing apparatus 110 calculates an L2 norm of a vector representation $u'_v$=vec [u'] of a difference spread image u'.

Next, in a metric projection step S1002, the image processing apparatus 110 determines $u''_v$=Ball ($u'_v$, ε) using Expression (21). In other words, the image processing apparatus 110 determines whether or not the L2 norm determined in step S1001 satisfies $$\|u'_v\|_2 \le \varepsilon$$

and if so, adopts $$u''_v = u'_v$$

but if not, adopts $$u''_v = \varepsilon \frac{u'_v}{\|u'_v\|_2}$$

Subsequently, in a difference spread image update step S1003, the image processing apparatus 110 rearranges the vector representation $u''_v$ and adopts a result thereof as a difference spread image u".

(Application of Optimization Algorithm to Convex Optimization Problem)

In order to explain the processing of the initial value setting step S601 and the iterative calculation step S602 shown in FIG. 6, a method of solving the convex optimization problem represented by Expression (17) by applying an optimization algorithm thereto will be described.

While the convex optimization problem represented by Expression (17) can be solved using various iterative methods, in the present embodiment, a solution method using the Primal-dual Splitting Method (hereinafter, described as the PDS method) will be described as an example.

The PDS method is an iterative method that is effective when an objective function includes a non-differentiable function such as an L1 norm. With the PDS method, an iterative calculation formula for solving a convex optimization problem that is formulated by Expression (25) below can be determined.

$$f^{(*)} = \underset{f}{\operatorname{argmin}} A(L(f)) + B(f) \quad (25)$$

where functions A and B are convex functions and L denotes a linear operator. According to the PDS method, an iterative calculation formula of the convex optimization problem formulated by Expression (25) is as follows.

$$z^{(n+1)} = \text{Prox}_{\sigma A^*}(z^{(n)} + \sigma L(t^{(n)})) \tag{26a}$$

$$f^{(n+1)} = \text{Prox}_{\tau B}(f^{(n)} - \tau L^*(z^{(n+1)})) \tag{26b}$$

$$t^{(n+1)} = 2f^{(n+1)} - f^{(n)} \tag{26c}$$

σ in Expression (26a) and τ in Expression (26b) are parameters set in the initial value setting step S601.

Functions in Expressions (26a) and (26b) which begin with Prox and have the parameter σ or τ and a function name as a subscript are functions referred to as a proximity operator of the function in the subscript and are defined as follows.

$$Prox_{\sigma A}(x) = \underset{y}{\text{argmin}}\left(\frac{1}{2}\|x - y\|^2 + \sigma A(y)\right) \tag{27}$$

Since a proximity operator of the function B is similarly defined, a description thereof will be omitted.

A function A* in Expression (26a) is a Fenchel-Rockafellar conjugate function of the function A and is defined by Expression (28) below. Using Moreau resolution, a proximity operator of the conjugate function A* can be calculated using the proximity operator of the function A as expressed by Expression (29).

$$A^*(y) = \underset{x}{\max}(\langle x, y \rangle - A(x)) \tag{28}$$

$$Prox_{\sigma A^*}(x) = x - \sigma Prox_{\frac{A}{\sigma}}\left(\frac{x}{\sigma}\right) \tag{29}$$

In addition, L* in Expression (26b) is an adjoint operator of L and satisfies the following relationship.

$$\langle x, L(y) \rangle = \langle L^*(x), y \rangle \tag{30}$$

By associating Expression (17) with Expression (25), the function A becomes an L1 norm, the function B becomes an indicator function I, and L becomes ∇ (nabla). In addition, when L is ∇, L* is known to be −div (divergent).

A discrete ∇ and a discrete divergence can be determined by the following calculation.

$\nabla u \in R^{N \times N \times 2}$ corresponding to data satisfying $u \in R^{N \times N}$ is $$(\nabla u)_{i,j} = ((\nabla u)^1_{i,j}, (\nabla u)^2_{i,j})$$

$$(\nabla u)^1_{i,j} = \begin{cases} u_{i+1,j} - u_{i,j} & \text{if } i < N \\ 0 & \text{if } i = N \end{cases}$$

$$(\nabla u)^2_{i,j} = \begin{cases} u_{i,j+1} - u_{i,j} & \text{if } i < N \\ 0 & \text{if } i = N \end{cases}$$

(a vector having a differential value in the i,j direction is obtained for each pixel).

In addition, $div(p) \in R^{N \times N}$ corresponding to data satisfying $p = (p^1, p^2) \in R^{N \times N \times 2}$ is as follows.

$$(div(p))_{i,j} = \begin{cases} p^1_{i,j} - p^1_{i-1,j} & \text{if } 1 < i < N \\ p^1_{i,j} & \text{if } i = 1 \\ -p^1_{i-1,j} & \text{if } i = N \end{cases} + \begin{cases} p^2_{i,j} - p^2_{i,j-1} & \text{if } 1 < j < N \\ p^2_{i,j} & \text{if } j = 1 \\ -p^2_{i,j-1} & \text{if } j = N \end{cases}$$

Therefore, with the PDS method, an approximate solution can be determined by the iterative calculation presented below.

$$z^{(n+1)} = PROX_{\|\cdot\|_1^*}(z^{(n)} + \sigma \nabla(t^{(n)}), \sigma) \tag{31a}$$

$$f^{(n+1)} = PROX_I(f^{(n)} + \tau \, div(z^{(n+1)}), \tau) \tag{31b}$$

$$t^{(n+1)} = 2f^{(n+1)} - f^{(n)} \tag{31c}$$

However, in order to make parameters of the proximity operators more comprehensible, in Expressions (31a) to (31c), a proximity operator is expressed by $$Prox_{\gamma F}(x) = PROX_F(x, \gamma)$$

Next, a calculation method of Expressions (31a) to (31c) will be described.

(Regarding Calculation of Proximity Operator of Conjugate Function of L1 Norm)

A proximity operator of a conjugate function of an L1 norm is determined by $$PROX_{\|\cdot\|_1^*}(x, \sigma) = x - \sigma PROX_{\|\cdot\|_1}\left(\frac{x}{\sigma}, \frac{1}{\sigma}\right) \tag{32}$$

and can be calculated by internally calling the following proximity operator of the L1 norm.

$$(PROX_{\|\cdot\|_1}(z, \lambda))_i = \max\left(0, 1 - \frac{\lambda}{|z_i|}\right)z_i \tag{33}$$

When $z_i$ is a vector, since $|z_i|$ corresponds to a calculation of determining an absolute value after determining an L2 norm of the vector $z_i$, $|z_i|$ becomes equal to an L2 norm of the vector $z_i$.

In other words, by substituting x/σ for z and 1/σ for λ in the proximity operator of the L1 norm presented above, a value of $$PROX_{\|\cdot\|_1}\left(\frac{x}{\sigma}, \frac{1}{\sigma}\right)$$

in Expression (32) can be calculated.

(Regarding Calculation of Proximity Operator of Indicator Function I)

The proximity operator of the indicator function I is a metric projection irrelevant to τ and is determined by the following expression.

$$PROX_I(x, \tau) = P_{C_{255,M}}(x) = \begin{cases} (x)_{i,j} = 0, & \text{if } (x)_{i,j} < 0 \\ (x)_{i,j} = (x)_{i,j}, & \text{if } 0 \leq (x)_{i,j} \leq 255 \\ (x)_{i,j} = 255, & \text{if } (x)_{i,j} > 255 \end{cases} \tag{34}$$

In other words, this represents that elements of x below 0 are changed to 0, elements exceeding 255 are changed to 255, and other elements are not changed.

(Optimization Processing Flow when Using PDS Method)

Next, an optimization processing flow when using the PDS method will be described. Since an optimization process (step S502 in FIG. 5) using an iterative method has already been described with reference to FIG. 6, only differences therefrom will be described.

First, in the initial value setting step S601, the image processing apparatus 110 sets σ and τ which are parameters of the PDS method. In addition, as an example of initial values for performing iterative calculations, the image processing apparatus 110 sets $z^{(0)}=0$, $t^{(0)}=g$, and $f^{(0)}=g$. As σ and τ, values conforming to a convergence requirement of an approximate solution in the PDS method are set such as σ=10 and τ=0.9/(8σ). The convergence requirement is expressed as $$\sigma\tau\|L\|_{op}^2 < 1, \|\nabla\|_{op}^2 \le 8$$

where $\|L\|_{op}$ denotes an operator norm of L.

Next, in the iterative calculation step S602, the image processing apparatus 110 determines $f^{(n)}$ for n=1 and thereafter using Expressions (31a) and (31b). For n=1, the initial values $f^{(0)}$, $t^{(0)}$, and $z^{(0)}$ set in step S601 are used. Subsequently, in the solution space restriction step S603, as described with reference to FIG. 7, the image processing apparatus 110 updates the value of $f^{(n+1)}$ calculated using Expression (31b) with a value that satisfies constraints C1 and C2. Moreover, when using the PDS method, after updating $f^{(n+1)}$ in the approximate solution update step S704, a process of substituting the updated $f^{(n+1)}$ into Expression (31c) and determining $t^{(n+1)}$ necessary for a next iterative calculation is performed as an additional process. Since processing of step S604 and thereafter is identical to the contents described earlier, a description thereof will be omitted.

This concludes the description of the fixed-pattern noise reduction process according to the present embodiment.

Moreover, while a case of solving Expression (15) by fitting an indicator function I(f) of a closed convex set $C_{255,M}$ into a function B as expressed by Expression (17) has been described as an example of solving Expression (15) by the PDS method, it is needless to say that many other modifications are available. For example, as expressed by Expression (17') below, Expression (15) can be solved by assigning an indicator function I'(f) of a closed convex set $C_1 \cap C_2$ which is a set satisfying both the constraint C1 and the constraint C2 into the function B.

$$f^{(*)} = \underset{f}{\operatorname{argmin}}(\|\nabla f\|_1 + I'(f)) \; s.t. \; f \in C_{255,M} \qquad (17')$$

In this case, a proximity operator of the indicator function I'(f) is determined by a metric projection to the closed convex set $C_1 \cap C_2$. In addition, the metric projection to the closed convex set $C_1 \cap C_2$ can be implemented by first performing a metric projection to the closed convex set $C_1$ and subsequently performing a metric projection to the closed convex set $C_2$. Since calculation methods of the respective metric projections have already been described, a description thereof will be omitted. Moreover, omitting the constraint $f \in C_{255,M}$ in Expression (17') and replacing the constraint with a process of determining a spread image $f^{(*)}$ and subsequently limiting brightness to a range of [0, 255] results in an optimization problem without constraints.

In addition, as a modification of solving Expression (15) with the PDS method, incorporating the constraint $f \in C_{255,M}$ and the constraint $f \in C_1 \cap C_2$ into an objective function by assignment so that a part of the function A of the PDS method includes an indicator function enables a change to an optimization problem without constraints. For example, in Expression (25), a linear operator L, a function A, and a function B are respectively fitted such that $L: f \to (\nabla f, f)$, $A:(z_1,z_2) \to \|z_1\|_1 + I'(z_2)$, and $B: f \to I(f)$. With the function A, since a variable of a function constituting the function A differs (variable-separated), a proximity operator of the function A can be separated into a proximity operator of a function that constitutes the function A. Since the respective proximity operators are known, an iterative calculation formula may be determined. Moreover, as a method of associating an indicator function with the functions A and B, an indicator function I may be associated with a part of the function A and an indicator function I' may be associated with the function B. Even in this case, an iterative calculation formula can be determined in a similar manner.

(Regarding Other Objective Functions)

Heretofore, cases where total variation is used as metrics to assess smoothness of an entire out-of-focus image group have been described. However, as described earlier, various metrics other than total variation can be used.

For example, there is a metric known as total generalized variation (hereinafter, abbreviated as TGV). TGV is a metric which not only considers a primary differential (or a difference) of an image but also considers an amount of variation with respect to higher-order differentials (or a plurality of differences with respect to the difference). Therefore, when TGV is used as a metric of an objective function, step-like artifacts which occur in a gradation region of an image can be suppressed as compared to using total variation.

For example, two-dimensional TGV is expressed by the following expression.

$$TGV_\alpha^2(u) = \underset{q}{\operatorname{argmin}}\{\alpha_1\|\nabla u - q\|_1 + \alpha_2\|G(q)\|_1\} \qquad (35)$$

where $$G(q) = \frac{1}{2}(\nabla q + \nabla q^T)$$

Although a secondary differential (G∇) is not explicitly included in Expression (35), Expression (35) can be considered an infimal convolution of two functions of the primary differential (∇) and the secondary differential (G∇). Therefore, Expression (35) gives a value close to a minimum value of a sum of an L1 norm of the primary differential and an L1 norm of the secondary differential. Moreover, $\alpha_1$ and $\alpha_2$ are parameters for controlling a balance between the primary differential and the secondary differential.

Using the TGV expressed by Expression (35) in place of total variation in Expression (17) enables Expression (17) to be modified as follows.

$$f^{(*)} = \underset{f,q}{\operatorname{argmin}}\,(\alpha_1\|\nabla f - q\|_1 + \alpha_2\|G(q)\|_1 + I(f)) \qquad (36)$$

$$s.t. \begin{cases} (f_{[i,j]} - g_{[i,j]}) \| d, \forall i, j \in \{1, \dots, N\} \\ \|f - g\|_2 \le \varepsilon \end{cases}$$

By associating the objective function of Expression (36) with L, A, and B in Expression (25) as follows, Expression (36) can be solved by the PDS method.

$$L:(f,q) \to (\nabla f - q, G(q))$$

$$A:(z_1,z_2) \to \alpha_1\|z_1\|_1 + \alpha_2\|z_2\|_1$$

$$B:(f,q) \to I(f)$$

where → denotes mapping.

Since a method of determining the iterative calculation formula of Expression (36) is not an essential portion of the present invention and is also described in known documents in which TGV is applied to the reduction of random noise in an image, details will be omitted. Moreover, besides TGV, a plurality of metrics related to smoothness of an image which use high-order differential (differences) are known. Methods using such metrics in place of the total variation expressed by Expression (17) also fall within the scope of the present invention.

(Differentiable Metrics)

As an example of metrics representing smoothness of an entire image, the following differentiable function may be used.

$$J_\beta(f) = \sqrt{\|\nabla f\|_1^2 + \beta} \tag{37}$$

where β denotes a small positive real number.

When using $J_\beta(f)$ defined in Expression (37) in place of total variation in Expression (15) or Expression (17), since $J_\beta(f)$ is a differentiable function, iterative methods such as a steepest descent method or Newton's method which use differentials in an iterative calculation formula can be applied.

In the convex optimization problem formulated by Expression (15) or Expression (17), a constraint can be transferred to an objective function using an indicator function, the Lagrange multiplier method, or the like. In addition, TV and TGV which are objective functions can be transferred to a constraint by known techniques. Furthermore, when solving a convex optimization problem including a non-differentiable objective function, various algorithms other than the PDS method can be applied. Examples include the forward-backward splitting method, the Douglas-Rachford splitting method, and the alternating direction method of multipliers (ADMM).

A feature of the present embodiment is that an amount of brightness change (an amount of corrected noise) for each pixel position is optimized so as to maximize smoothness of an entire out-of-focus image group under a condition that a same correction amount is to be subtracted from a corresponding pixel of each image constituting the out-of-focus image group. Moreover, by using metrics in an opposite relationship with image smoothness (for example, a variation amount of brightness in an image) in an objective function, "a sum of variation amounts in the entire out-of-focus image group may be minimized" instead of "maximizing smoothness of the entire out-of-focus image group". Any formulation of an optimization problem using an objective function and a constraint to realize the concept described above and the use of any optimization algorithm for solving the optimization problem also fall within the scope of the present invention.

As described above, by using the method according to the present embodiment, additive fixed-pattern noise which is attributable to an image sensor and which is included in an out-of-focus image group can be reduced with high accuracy. By using an out-of-focus image group in which fixed-pattern noise is reduced in this manner, image quality deterioration which poses a problem when generating an arbitrary viewpoint image or an arbitrary out-of-focus image by a filter type method from an out-of-focus image group can be suppressed.

<Second Embodiment>

The first embodiment describes a method of reducing fixed-pattern noise in a case where additive fixed-pattern noise that is independent of an image component of an image of an object has been added to an out-of-focus image group. However, in addition to additive fixed-pattern noise, there are fixed-pattern noises dependent on original signal data such as a variation in sensitivity among cells of an image sensor or a variation in gain of an amplifier or, in other words, dependent on an image component of an image of an object. Such fixed-pattern noise is referred to as multiplicative fixed-pattern noise. An out-of-focus image group $y_k \in R^{N \times N}$ (k=1, ..., M) to which multiplicative fixed-pattern noise has been added can be expressed by the following expression.

$$y_k = o_k + n_k (k=1, \ldots, M) \tag{38}$$

$$(n_k)_{i,j} = (v)_{i,j} \cdot (o_k)_{i,j} \tag{39}$$

$n_k \in R^{N \times N}$ (k=1, ..., M) in Expression (38) represents multiplicative fixed-pattern noise. Even when photography is performed by a same cell of a same image sensor, a value $(n_k)_{i,j}$ of multiplicative fixed-pattern noise differs when an image of the object changes.

$v \in R^{N \times N}$ in Expression (39) represents a noise source of multiplicative fixed-pattern noise. While a value $(v)_{i,j}$ of each pixel of v is attributable to various manufacturing errors of the image sensor, hereinafter, it is assumed that an occurrence frequency distribution of $(v)_{i,j}$ conforms to a normal distribution with an average of 0 and a standard deviation of $\sigma_m$. However, even if $(v)_{i,j}$ does not conform to a normal distribution, fixed-pattern noise can be reduced with the method according to the present embodiment.

Multiplicative fixed-pattern noise present in an out-of-focus image group $y_k$ (k=1, ..., M) can be modified to Expression (40) using Expressions (38) and (39).

$$(n_k)_{i,j} = \frac{(v)_{i,j}}{1+(v)_{i,j}} \cdot (y_k)_{i,j} \tag{40}$$

In the first embodiment, as expressed by Expression (13), an M-dimensional vector constituted by elements that are all 1 is set as a direction vector d for reducing the fixed-pattern noise shown in FIG. 8A. However, in the second embodiment, when reducing fixed-pattern noise in the out-of-focus image group $y_k$ (k=1, ..., M) given by Expression (38), intensity of the fixed-pattern noise is proportional to $(y_k)_{i,j}$ as expressed by Expression (40). Therefore, it is shown that a pixel vector $$d = g_{[i,j]} = ((y_1)_{i,j}, \ldots, (y_M)_{i,j}) \tag{41}$$

of the out-of-focus image group $y_k$ (k=1, ..., M) (or a spread image g) may be set as the direction vector d.

In addition, in the first embodiment, $$\varepsilon = (N\sqrt{M})\sigma$$

is used as ε representing a total amount of fixed-pattern noise in the spread image g (in other words, the entire out-of-focus image group) shown in FIG. 8B. This ε is an upper limit value of an amount of brightness change used in the constraint C2.

In the second embodiment, multiplicative fixed-pattern noise is represented by Expression (38). Therefore, $$\varepsilon = (N\sqrt{M}) y_a \sigma_m \tag{42}$$

is used as ε. $y_a$ denotes an average value of all pixels of the out-of-focus image group $y_k$ (k=1, ..., M).

$$y_a = \frac{1}{N^2 M} \sum_k^M \sum_{i,j}^N (y_k)_{i,j} \quad (43)$$

Expression (42) is an example of an approximate value of an L2 norm of a vector obtained by one-dimensionally arranging respective elements of multiplicative fixed-pattern noise $n_k$.

As described above, in order to realize reduction of multiplicative noise, the calculation formula of ε in the initial value setting step S601 and the method of acquiring the direction vector d in the direction vector acquisition step S902 of the constraint C1 application step S702 according to the first embodiment need only be corrected. In other words, with respect to the constraint C1, a constraint of multiplying a brightness value of a corresponding pixel of each image by a same value (correction coefficient) is set in the case of multiplicative noise. In addition, the upper limit value ε of the amount of brightness change used in the constraint C2 is set in accordance with brightness of the out-of-focus image group that is an input image (in the present embodiment, a value proportional to average brightness $y_a$ expressed by Expression (43) is adopted).

Internal processing of the optimization process step S502 according to the second embodiment will now be described.

In the initial value setting step S601, the image processing apparatus 110 sets initial values and parameters to be used in subsequent calculations. Specifically, an initial value and a parameter of an optimization algorithm which are used in the iterative calculation step S602, an upper limit value $n_{max}$ of the number of iterations and a threshold $e_{th}$ of convergence determination criteria to a solution which are used in the end determination step S604 are set. In addition, n=0 is set as an initial value of a counter of the number of iterations n. Next, the image processing apparatus 110 calculates a value of g using Expressions (42) and (43). Moreover, since the direction vector d is not fixed, the direction vector d is not set in step S601.

Since the subsequent iterative calculation step S602 is the same process as in the first embodiment, a description thereof will be omitted.

In the subsequent solution space restriction step S603, only the process of the constraint C1 application step S702 differs from the first embodiment. Hereinafter, the constraint C1 application step S702 according to the second embodiment will be described.

As shown in FIG. 9, in the constraint C1 application step S702, the image processing apparatus 110 repeats the processes of S902 to S905 for each pixel position (i,j) with respect to the spread image $f^{(n+1)}$. First, in the direction vector acquisition step S902, the image processing apparatus 110 acquires a pixel vector of a pixel position that is set as a processing target in a pixel loop and adopts the pixel vector as a direction vector. In other words, the image processing apparatus 110 performs a calculated expressed as $$d = g_{[i,j]} = V[g(i,j)]$$

and determines a different direction vector for each pixel position.

In the pixel correction vector acquisition step S903, in a similar manner to the first embodiment, the image processing apparatus 110 determines a pixel correction vector $u_{[i,j]}$ by calculating $u_{[i,j]} = V[u, (i,j)]$. Subsequently, in the orthogonal projection calculation step S904, in a similar manner to the first embodiment, the image processing apparatus 110 uses Expression (18) to determine an orthogonal projection vector $u'_{[i,j]}$ that is parallel to the direction vector d. Next, in the difference spread image update step S905, in a similar manner to the first embodiment, the image processing apparatus 110 writes calculated values of the pixel correction vector $u'_{[i,j]}$ to the difference spread image u'. Moreover, since the processes of the pixel loop S901 to S906 can be calculated independently for each pixel, parallel processing may be performed.

Since subsequent processes (the steps S604 to S606 in FIG. 6) are similar to those in the first embodiment, a description thereof will be omitted. A spread image $f^{(*)}$ determined as an approximate solution is input to the subsequent image output step S503. In step S503, the image processing apparatus 110 uses an operation E as expressed in Expression (16) to generate an out-of-focus image group $x_1^{(*)}, \ldots, x_k^{(*)}$ from the spread image $f^{(*)}$ in which fixed-pattern noise has been reduced.

A feature of the present embodiment is that a brightness change coefficient for each pixel position is optimized so as to maximize smoothness of an entire out-of-focus image group under a condition that a corresponding pixel of each image constituting the out-of-focus image group is to be multiplied by a same correction coefficient. Moreover, by using metrics in an opposite relationship with image smoothness (for example, a variation amount of brightness in an image) in an objective function, "a sum of variation amounts in the entire out-of-focus image group may be minimized" instead of "maximizing smoothness of the entire out-of-focus image group".

As described above, by using the method according to the present embodiment, multiplicative fixed-pattern noise which is attributable to an image sensor and which is included in an out-of-focus image group can be reduced with high accuracy. By using an out-of-focus image group in which fixed-pattern noise is reduced in this manner, image quality deterioration which poses a problem when generating an arbitrary viewpoint image or an arbitrary out-of-focus image by a filter type method from an out-of-focus image group can be suppressed.

<Third Embodiment>

Methods of reducing fixed-pattern noise by optimizing an entire out-of-focus image group during photography have been described in the first and second embodiments. However, as the number of images M constituting an out-of-focus image group increases, a calculation load (a computation amount or a memory) necessary for optimizing the entire out-of-focus image group increases.

In consideration thereof, in the present embodiment, a method of estimating fixed-pattern noise by selecting and optimizing a part of images from the images constituting an out-of-focus image group, and subsequently reducing fixed-pattern noise in the entire out-of-focus image group will be described. Using the method according to the present embodiment suppresses calculation load and enables high-speed processing even when the number of images M constituting an out-of-focus image group is large.

(Reduction of Additive Fixed-Pattern Noise)

Figure 11:
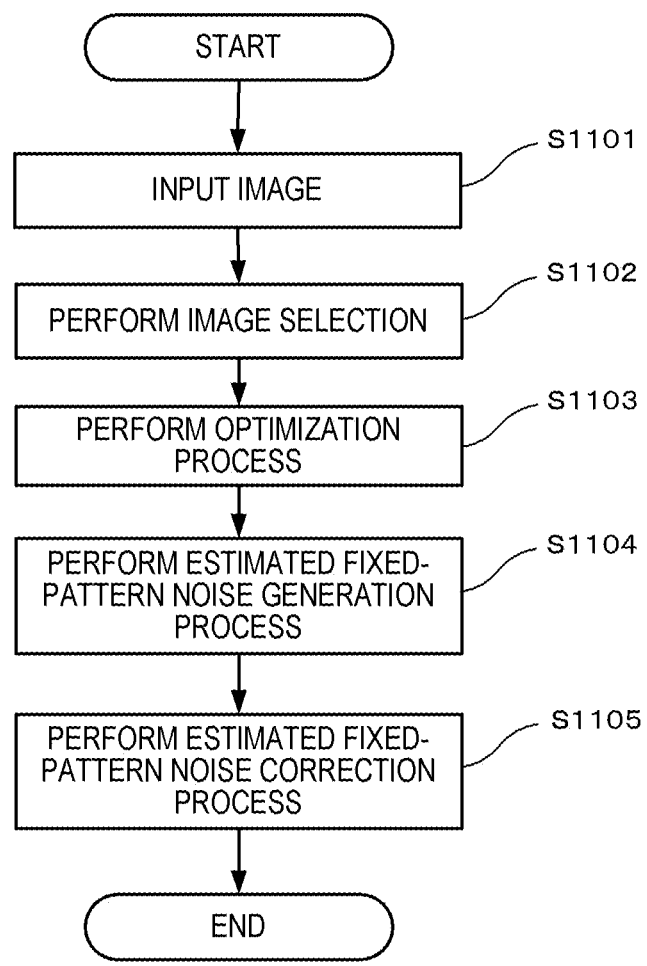
FIG. 11 is a flow chart showing a fixed-pattern noise reduction process according to a third embodiment.

FIG. 11 is a flow chart showing a fixed-pattern noise reduction process according to the present embodiment.

First, a case where fixed-pattern noise is reduced in an entire out-of-focus image group to which additive fixed-pattern noise has been added will be described. Moreover, in the fixed-pattern noise reduction process described in the present embodiment, favorably, a user is made to set, in advance, whether to perform reduction of multiplicative fixed-pattern noise or reduction of additive fixed-pattern noise, and processes of steps S1101 to S1105 are performed according to the setting.

First, in an image input step S1101, the image processing apparatus 110 acquires an out-of-focus image group $y_k$ (k=1, ..., M) to which fixed-pattern noise has been added. Next, in an image selection process step S1102, the image processing apparatus 110 selects $M_s$ ($M > M_s > 1$) number of images which constitute a part of the out-of-focus image group $y_k$ (k=1, ..., M) and generates a new out-of-focus image group $b_k \in R^{N \times N}$ (k=1, ..., $M_s$). In the present embodiment, the out-of-focus image group $b_k$ (k=1, ..., $M_s$) is used as an input image. The image processing apparatus 110 generates a spread image g from the out-of-focus image group $b_k$ (k=1, ..., $M_s$) using the operation T. Details will be provided later.

In an optimization process step S1103, the image processing apparatus 110 determines a spread image $f^{(*)}$ by reducing additive fixed-pattern noise in the spread image g. Since internal processing of the optimization process step S1103 is similar to that in the first embodiment, a description thereof will be omitted.

In an estimated fixed-pattern noise generation process S1104, the image processing apparatus 110 applies an operation E to the spread image $f^{(*)}$ to generate an out-of-focus image group $a_k \in R^{N \times N}$ (k=1, ..., $M_s$) in which fixed-pattern noise has been reduced. Next, the image processing apparatus 110 generates estimated fixed-pattern noise $n' \in R^{N \times N}$ by the following expression.

$$n' = \frac{1}{M_s} \sum_{k=1}^{M_s} (b_k - a_k) \tag{44}$$

Subsequently, in an estimated fixed-pattern noise correction process S1105, the image processing apparatus 110 removes the estimated fixed-pattern noise n' from an out-of-focus image group $y_k$ (k=1, ..., M) using Expression (45). Accordingly, an out-of-focus image group $x_k^{(*)}$ in which fixed-pattern noise has been reduced is generated.

$$x_k^{(*)} = y_k - n' (k=1, \ldots, M) \tag{45}$$

(Selection by Sampling)

Next, the process of the image selection process step S1101 will be described.

There are various methods for selecting an out-of-focus image group $b_k$ (k=1, ..., $M_s$) to be used in noise estimation from the out-of-focus image group $y_k$ (k=1, ..., M). An example of a simplest method is a method involving sampling at intervals determined in advance. For example, when a sampling interval is denoted by sp, the out-of-focus image group $b_k$ (k=1, ..., $M_s$) can be generated according to a relationship expressed by the following expression.

$$b_k = y_{k \cdot sp} (k=1, \ldots, M_s)$$

where $M_s$ denotes a largest integer equal to or smaller than M/sp. For example, if M=64 and sp=8, then $M_s$=8 and the out-of-focus image group $b_k$ (k=1, ..., $M_s$) is expressed as $$b_k = y_{8k} (k=1, \ldots, 8)$$

Moreover, the sampling intervals need not be regular intervals and sampling can also be performed irregularly. In the fixed-pattern noise reduction method described in the present embodiment, a sampling position accompanying focus blur is desirably selected as described with reference to FIG. 4B.

(Sampling and Weighted Average)

In addition, in order to suppress the effect of random noise, an image representing a simple average or a weighted average determined with respect to mp number of images preceding and following a position specified by the sampling interval sp may be generated and used for fixed-pattern noise estimation. In this case, for example, the out-of-focus image group bk can be determined by the following expression.

$$b_k = \sum_{l=-mp}^{mp} w(l) \cdot y_{((k-1) \cdot sp+l) \bmod M+1} \; (k=1, \ldots, M_s) \tag{46}$$

where w(l) denotes a coefficient representing a weight of a weighted average and satisfies the below expression.

$$\sum_{l=-mp}^{mp} w(l) = 1$$

Moreover, $((k-1) \cdot sp+l) \bmod M+1$ in Expression (46) represents that a cyclic position is to be selected when outside of a range expressed as $1 \leq k \cdot sp+l \leq M$.

(Exclusion of Vicinity of in-Focus Position)

Unlike the assumption described with reference to FIG. 4B, there may be cases where an amount of blur of an out-of-focus image group is small and blur of an image of an object is insufficient even at an end of the out-of-focus image group. If an image of the object appears at similar brightness in each image of the out-of-focus image group, it is difficult to distinguish between an image component of the object and a fixed-pattern noise component in an optimization process and, consequently, estimation accuracy of estimated fixed-pattern noise in step S1104 may decline.

In such a case, by excluding images in a vicinity of a position where the object is in focus among the images constituting the out-of-focus image group $y_k$ (k=1, ..., M), estimation accuracy of estimated fixed-pattern noise can be improved. To this end, in step S1102, an out-of-focus image group $b_k$ (k=1, ..., $M_s$) may be generated by excluding images with relatively high sharpness (or by selecting images with relatively low sharpness) from the out-of-focus image group $y_k$ (k=1, ..., M).

For example, the out-of-focus image group $b_k$ (k=1, ..., $M_s$) is generated by defining the following function $$Sel(k) = \frac{\alpha}{std(y_k)^\beta} \; (k=1, \ldots, M) \tag{47}$$

which lowers a value of an image in a vicinity of an in-focus position and selecting a plurality of images $y_k$ of which a value of Sel (k) is equal to or larger than a prescribed threshold $s_{th}$. Moreover, in Expression (47), std($y_k$) denotes a function for determining a standard deviation of an image $y_k$, α denotes a constant for adjusting a sum of Sel (1) to Sel (M) to 1, and β (>0) denotes a function parameter.

By applying a method of setting the sampling interval described earlier and selecting images or a method of determining a weighted average and selecting images to a plurality of images $y_k$ of which a value of Sel (k) is equal to or larger than the threshold $s_{th}$, the number of images of the out-of-focus image group to be used in fixed-pattern noise estimation may be further reduced.

(Reduction of Multiplicative Fixed-Pattern Noise)

Next, a case where fixed-pattern noise is reduced in an entire out-of-focus image group to which multiplicative fixed-pattern noise has been added will be described. As described earlier, favorably, a user is made to set, in advance, whether to perform reduction of multiplicative fixed-pattern noise or reduction of additive fixed-pattern noise, and processes of steps S1101 to S1105 are performed according to the setting.

Since the processes of steps S1101 and S1102 are the same as a case of reducing additive noise, a description thereof will be omitted. In the optimization process step S1103, the image processing apparatus 110 reduces the multiplicative fixed-pattern noise described in the second embodiment. In the estimated fixed-pattern noise generation process step S1104, the image processing apparatus 110 determines an estimated value $v' \in R^{N \times N}$ of a noise source of fixed-pattern noise using a calculation expressed by the following expression.

$$(v')_{i,j} = \frac{(n_s^{(ave)})_{i,j}}{(a^{(ave)})_{i,j}}, \quad (48)$$

$$i, j \in \{1, \ldots, N\}$$

where $n_s^{(ave)}$ denotes an average value of estimated multiplicative fixed-pattern noise and $a^{(ave)}$ denotes an average image of an out-of-focus image group $a_k$ ($k=1, \ldots, M_s$) after reduction of fixed-pattern noise, which are respectively determined by the following expressions.

$$n_s^{(ave)} = \frac{1}{M_s} \sum_{k=1}^{M_s} (b_k - a_k)$$

$$a^{(ave)} = \frac{1}{M_s} \sum_{k=1}^{M_s} a_k$$

Alternatively, an estimated value $v'$ of the noise source of the fixed-pattern noise may be determined using the following expression instead of Expression (48). The following expression signifies estimating a noise source of multiplicative fixed-pattern noise based on a ratio of an image after brightness change to an input image before the brightness change.

$$(v')_{i,j} = \frac{1}{M_s} \sum_{k=1}^{M_s} \left( \frac{(b_k)_{i,j}}{(a_k)_{i,j}} - 1 \right),$$

$$i, j \in \{1, \ldots, N\}$$

In the estimated fixed-pattern noise correction process step S1105, the image processing apparatus 110 reduces multiplicative fixed-pattern noise using a calculation expressed by the following expression.

$$(x_k^{(*)})_{i,j} = \frac{(y_k)_{i,j}}{1 + (v')_{i,j}}, \quad (49)$$

$$i, j \in \{1, \ldots, N\},$$

$$k \in \{1, \ldots, M\}$$

Alternatively, multiplicative fixed-pattern noise may be reduced using the following expression.

$$(x_k^{(*)})_{i,j} = (y_k)_{i,j} - (v')_{i,j}(y_k)_{i,j}, i,j \in \{1, \ldots, N\}, k \in \{1, \ldots, M\} \quad (50)$$

Using the method described in the present embodiment enables a reduction process of fixed-pattern noise to be performed in which a calculation load is suppressed when the number of images in an out-of-focus image group increases. Therefore, a fixed-pattern noise reduction process can be performed even with an image processing apparatus or a dedicated arithmetic apparatus with limited calculation resources. In addition, when focus blur of an out-of-focus image group is insufficient, estimation accuracy of fixed-pattern noise can be enhanced by excluding a part of the images.

Furthermore, in the present embodiment, a plurality of estimated fixed-pattern noises can be generated from a plurality of out-of-focus image groups with different objects and estimated fixed-pattern noise with even higher accuracy can be generated from the plurality of estimated fixed-pattern noises. By performing an estimated fixed-pattern noise correction process (step S1105 in FIG. 11) using highly-accurate estimated fixed-pattern noise enables an out-of-focus image group with higher image quality to be generated.

<Fourth Embodiment>

In the second embodiment, a method of realizing an optimization process for reducing multiplicative fixed-pattern noise in a fixed-pattern noise reduction process has been described. In the present embodiment, a method of reducing multiplicative fixed-pattern noise with a method that differs from the second embodiment will be described. Moreover, in the present embodiment, a standard deviation $\sigma_m$ of multiplicative fixed-pattern noise $(v)_{i,j}$ will be described as $\sigma$ for the sake of simplicity.

When fixed-pattern noise is multiplicative noise, multiplicative noise can be brought close to additive noise by applying appropriate gradation transformation to an image. As the gradation transformation, for example, logarithmic transformation or Anscombe transform can be applied. In the present embodiment, a process using logarithmic transformation will be described as an example.

From Expression (38) and Expression (39), an out-of-focus image group $y_1, \ldots, y_m$ to which multiplicative fixed-pattern noise has been added can be expressed by the following expression.

$$(y_k)_{i,j} = (o_k)_{i,j} \cdot \{1 + (v)_{i,j}\}, i,j \in \{1, \ldots, N\}, k \in \{1, \ldots, M\} \quad (51)$$

By taking the logarithm of both sides of Expression (51), the following expression is derived.

$$\log((y_k)_{i,j}) = \log((o_k)_{i,j}) + \log(\{1 + (v)_{i,j}\}), i,j \in \{1, \ldots, N\}, k \in \{1, \ldots, M\} \quad (52)$$

In other words, by taking the logarithm of an out-of-focus image group, multiplicative fixed-pattern noise can be treated as additive noise.

Figure 12:
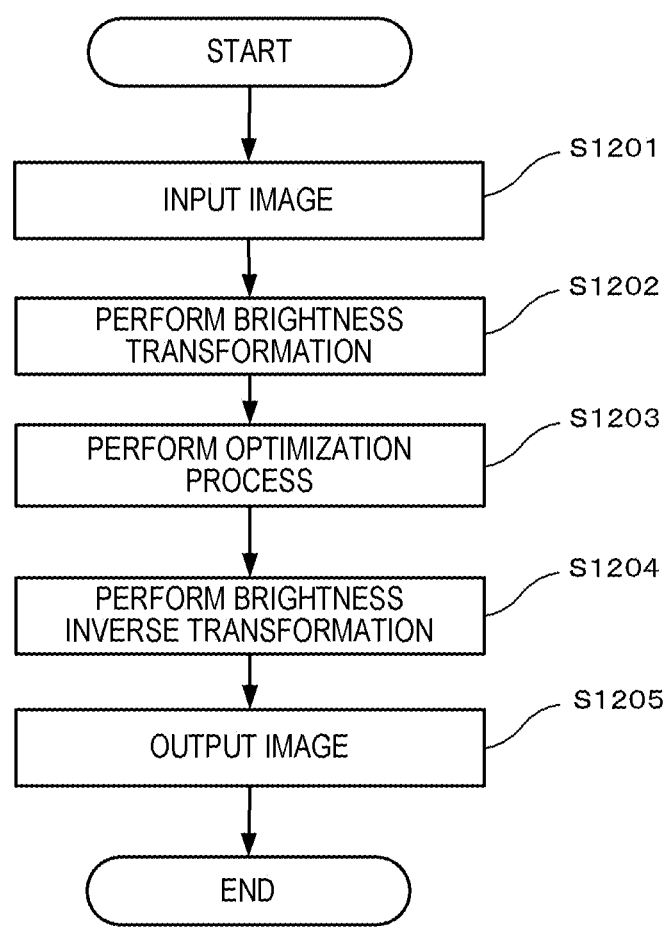
FIG. 12 is a flow chart showing a fixed-pattern noise reduction process according to a fourth embodiment.

FIG. 12 is a flow chart showing a fixed-pattern noise reduction process according to the present embodiment. Processing according to the present embodiment will be described with reference to FIG. 12.

First, in an image input step S1201, the image processing apparatus 110 inputs the out-of-focus image group $y_1, \ldots, y_M$ and generates a spread image g using the operation T. In a brightness transformation step S1202, the image processing apparatus 110 performs a logarithmic transformation on brightness of each pixel of the spread image g and determines a spread image $g_c$.

Next, in an optimization process step S1203, the image processing apparatus 110 performs a similar process as the optimization process step S502 according to the first embodiment, and determines a spread image $f_c^{(*)}$ by reducing additive fixed-pattern noise in the spread image $g_c$. However, in the present embodiment, in the initial value setting step S601, as a value of ε, a value corresponding to an L2 norm of fixed-pattern noise after brightness transformation is set (for example, $\varepsilon=(N(M)^{1/2})\sigma$). This is because when x is close to 0, log (1+x) can be approximated to x.

Subsequently, in a brightness inverse transformation step S1204, the image processing apparatus 110 applies an exponential function that is an inverse transformation of the logarithmic transformation to brightness of each pixel of the spread image $f_c^{(*)}$ and determines a spread image $f^{(*)}$. Finally, in an image output step S1205, the image processing apparatus 110 uses an operation E as expressed in Expression (16) to generate an out-of-focus image group $x_1^{(*)}, \ldots, x_M^{(*)}$ from the spread image $f^{(*)}$ in which fixed-pattern noise has been reduced.

According to the processing described above, multiplicative fixed-pattern noise can be reduced.

Next, a multiplicative fixed-pattern noise reduction method which accurately reduces multiplicative fixed-pattern noise will be described.

(Changes in Average and Dispersion of Noise Due to Logarithmic Transformation)

When multiplicative fixed-pattern noise $(v)_{i,j}$ of each pixel is denoted by w, a second term of a right side of Expression (52) can be expressed as log (1+w). When w is sufficiently close to 0 or, in other words, when the standard deviation σ of w is sufficiently close to 0, since log (1+w) can be sufficiently approximated by a primary approximate expression (log (1+w)=w) due to Maclaurin expansion, fixed-pattern noise after logarithmic transformation of brightness is assumed to be unchanged with an average of 0 and a dispersion of $\sigma^2$. Therefore, as described earlier, a method of reducing additive fixed-pattern noise can be applied without modification.

However, as w departs from 0, an average and a dispersion of additive fixed-pattern noise obtained after performing a logarithmic transformation of brightness of an image or, in other words, an average and a dispersion of log (1+w) depart from the approximation described above and can no longer be considered noise with an average of 0 and a dispersion of $\sigma^2$. As a result, performance of fixed-pattern noise reduction declines.

An average and a dispersion of noise after applying gradation transformation are determined by a probability density distribution of the original noise and an expression of the gradation transformation. Multiplicative fixed-pattern noise (w) of an image sensor is attributable to a variation in pixel sensitivity of each pixel (PRNU) and a probability density distribution thereof is known to be expressible by a normal distribution N (0, $\sigma^2$) with an average of 0 and a dispersion of $\sigma^2$. However, when the probability density distribution of the multiplicative fixed-pattern noise (w) is a normal distribution, it is difficult to analytically determine an average or a dispersion of a component corresponding to fixed-pattern noise after performing a logarithmic transformation of brightness of an input image or, in other words, an average or a dispersion of log (1+w). Therefore, an approximate value of the average or the dispersion may be effectively determined using Maclaurin expansion.

An N-th order approximate expression of log (1+w) due to Maclaurin expansion is expressed as $$\log(1+w) = \sum_{n=1}^{N} \frac{(-1)^{n-1}}{n} w^n \qquad (53)$$

(where |w|<1), and an approximation with higher accuracy is obtained by increasing the number N.

Table 1 presents approximate values $(\mu_{ta}, \sigma_{ta}^2)$ of an average $\mu_t$ and a dispersion $\sigma_t^2$ of log (1+w) determined using primary to quartic approximate expressions due to Maclaurin expansion when a probability density distribution of w conforms to a normal distribution N (0, $\sigma^2$).

TABLE 1

| Order N | Approximate value of average $\mu_t$ ($\mu_{ta}$) | Approximate value of dispersion $\sigma_t^2$ ($\sigma_{ta}^2$) |
|---|---|---|
| 1 | 0 | $\sigma^2$ |
| 2 | $-\frac{1}{2}\sigma^2$ | $\sigma^2 + \frac{1}{2}\sigma^4$ |
| 3 | $-\frac{1}{2}\sigma^2$ | $\sigma^2 + \frac{5}{2}\sigma^4 + \frac{5}{3}\sigma^6$ |
| 4 | $-\frac{1}{2}\sigma^2 - \frac{3}{4}\sigma^4$ | $\sigma^2 + \frac{5}{2}\sigma^4 + \frac{14}{3}\sigma^6 + 6\sigma^8$ |

(In Table 1, approximate expressions for an average and a dispersion of the respective orders were determined using an expression where, when a random variable W conforms to N (0, $\sigma^2$), an n-th order moment of the random variable W (an expectation value of $W^n$) $E[W^n]$ is 0 when n is an odd number and $\sigma^n (n-1) \cdot (n-3) \cdot \ldots \cdot 3 \cdot 1$ when n is an even number).

While accuracy obviously increases as the order N increases, in practice, an order N which can be sufficiently approximated by a standard deviation σ of around 0.2 may suffice. (Multiplicative fixed-pattern noise can be expressed by a normal distribution when almost all of 1+w are positive or, in other words, when around σ≤0.2). Therefore, an approximate order $N_m$ which enables sufficient accuracy to be attained may be determined in advance by a calculation, an experiment, or the like.

For example, an order N which causes respective differences of an approximate average value $(\mu_{ta})$ and an approximate dispersion value $(\sigma_{ta}^2)$ when the order N is updated to N+1 to equal or fall under prescribed thresholds is set as $N_m$. Alternatively, $N_m$ may be experimentally determined by performing a simulation with a large number of images using a processing flow of multiplicative fixed-pattern noise reduction to be described later. Specifically, an order N which enables a difference in image quality when reducing fixed-pattern noise using approximate values of averages and dispersions of orders N and N+1 to fall to or below an imperceptible level is determined as $N_m$.

In addition, polynomials (for example, expressions such as those shown in Table 1) related to a standard deviation σ for determining an average $\mu_{ta}$ and a dispersion $\sigma_{ta}^2$ of the $N_m$-th order are mounted as a program in the image processing apparatus 110. Accordingly, approximate values of an average and a dispersion of fixed-pattern noise (log (1+w)) after logarithmic transformation can be determined from the standard deviation σ (or the dispersion $\sigma^2$) of multiplicative fixed-pattern noise included in an input image.

(Correction of Amount of Average Shift)

It should be noted that, as shown in Table 1, there is a phenomenon where an average of fixed-pattern noise after logarithmic transformation is no longer 0 for secondary and higher-order approximations. Therefore, there may be cases where the use of a conventional optimization process for reducing additive noise prevents a solution that reduces fixed-pattern noise from being found in a closed convex set $C_2$ (an L2 norm sphere with a spread image $g_c$ obtained by logarithmic transformation as a center) and prevents noise from being appropriately reduced.

In contrast, in order to reduce fixed-pattern noise by applying the additive noise reduction method described in the present embodiment, a method using gradation transformation which corrects an average after logarithmic transformation to 0 by correcting a deviation of an average $\mu_t$ after the transformation is conceivable. Specifically, this can be realized by applying a gradation transformation f expressed by $$f(x) = \log(x) - \mu_t \qquad (54)$$

to brightness of each pixel of an out-of-focus image group to which multiplicative fixed-pattern noise has been added. Since $\mu_t$ is a value based on the standard deviation σ of the multiplicative fixed-pattern noise, Expression (54) represents a process of subtracting a bias component not dependent on brightness from the logarithmically-transformed brightness.

By applying the gradation transformation f to an out-of-focus image group to which multiplicative fixed-pattern noise has been added, the following Expression (55) is obtained.

$$\log((y_k)_{i,j}) - \mu_t = \log((o_k)_{i,j}) + \log(1+(v)_{i,j}) - \mu_t,$$
$$i,j \in \{1, \ldots, N\}, k \in \{1, \ldots, M\} \qquad (55)$$

When a portion excluding a first term of the right side of Expression (55) or, in other words, $\log(1+w) - \mu_t$ is considered new fixed-pattern noise, Expression (55) shows that fixed-pattern noise after application of the gradation transformation f is converted to additive fixed-pattern noise with an average of 0 and a dispersion of $\sigma_t^2$. Therefore, in a subsequent additive fixed-pattern noise reduction process (optimization process S1203), by setting a radius ε of the L2 norm sphere of the closed convex set $C_2$ to $\varepsilon = (N(M)^{1/2})\sigma_t$, a solution is found in the L2 norm sphere with the spread image $g_c$ as its center and fixed-pattern noise can be reduced in an appropriate manner. Moreover, as the average $\mu_t$ and the standard deviation $\sigma_t$, $\mu_{ta}$ and $\sigma_{ta}$ for the $N_m$-th order are respectively used.

On the other hand, in the brightness inverse transformation step S1204 following the optimization process step S1203, an exponential function that is an inverse transformation of the logarithmic transformation need only be applied to brightness of each pixel and a process related to a bias component $\mu_t$ is not required. This is because fixed-pattern noise has already been reduced in the optimization process step S1203 and changes in an average and a dispersion of fixed-pattern noise due to the inverse transformation need not be considered.

Due to the process described above, even when the multiplicative fixed-pattern noise w is not sufficiently close to 0, the additive fixed-pattern noise reduction process described in the first embodiment can be applied to accurately reduce fixed-pattern noise.

(Processing Flow of Multiplicative Fixed-Pattern Noise Reduction Process with Improved Performance)

Next, a reduction process of multiplicative fixed-pattern noise with improved performance will be described with reference to FIG. 12.

First, in an initial setting step (not illustrated), by a polynomial related to σ in each of an average $\mu_t$ and a dispersion $\sigma_t^2$ of fixed-pattern noise after a logarithmic transformation of an $N_m$-th order which can be approximated with sufficient accuracy, respective approximate values $\mu_{ta}$ and $\sigma_{ta}^2$ are determined. The approximate values can be readily calculated from the standard deviation σ of the multiplicative fixed-pattern noise of the input image using a program in the image processing apparatus 110 as described earlier.

In the following image input step S1201, the image processing apparatus 110 inputs an out-of-focus image group $y_1, \ldots, y_M$ and generates a spread image g using the operation T.

Next, in the brightness transformation step S1202, the image processing apparatus 110 applies the gradation transformation f expressed by Expression (54) to brightness of each pixel of the spread image g and generates a spread image $g_c$.

Subsequently, in the optimization process step S1203, the image processing apparatus 110 determines a spread image $f_c^{(*)}$ by reducing additive fixed-pattern noise in the spread image $g_c$. In this case, in the initial value setting step S601 in the optimization process step, a value corresponding to an L2 norm of fixed-pattern noise after applying the gradation transformation f is set as a value of ε. Specifically, $\varepsilon = (N(M)^{1/2})\sigma_{ta}$.

Next, in the brightness inverse transformation step S1204, the image processing apparatus 110 applies an exponential function that is an inverse transformation of the logarithmic transformation to brightness of each pixel of the spread image $f_c^{(*)}$ and determines a spread image $f^{(*)}$.

Finally, in the image output step S1205, the image processing apparatus 110 uses an operation E as expressed in Expression (16) to generate an out-of-focus image group $x_1^{(*)}, \ldots, x_M^{(*)}$ from the spread image $f^{(*)}$ in which fixed-pattern noise has been reduced.

While a case where a probability density distribution of multiplicative fixed-pattern noise w can be expressed by a normal distribution has been described above, the method of the present embodiment is also applicable to cases where the probability density distribution is expressed by other distributions. For example, it is known that, when a probability density distribution of multiplicative noise w can be expressed by a Gamma distribution, analytical solutions of an average and a dispersion of the noise after a logarithmic transformation can be determined. In this case, in the initial setting step (not illustrated), analytical solutions may be calculated using formulas for analytically determining an average $\mu_t$ and a dispersion $\sigma_t^2$.

Moreover, although a logarithmic transformation is not applicable when brightness of input image data is 0, this can be accommodated by introducing an additional exception process to the input/output processes of an image. For example, in the image input step S1201, with respect to a pixel of which brightness is 0 in the image processing apparatus 110, pixel position information of the pixel is stored and brightness is changed to 1. (Since the change in brightness from 0 to 1 is small, image quality is hardly affected). In addition, in the image output step S1205, the pixel position information is referred to and brightness of the corresponding pixel is changed to 0. (The change to 0 is rational because when brightness is 0, multiplicative noise is also 0).

Moreover, even when fixed-pattern noises other than additive and multiplicative noises are present, such fixed-pattern noises can be reduced by using the method according to the present embodiment. For example, in the case of Poisson noise in which a dispersion $\sigma^2$ of fixed-pattern noise is average brightness, Anscombe transform which is a type of variance-stabilizing transformation is applied. Accordingly, Poisson noise can be treated as additive noise. In the brightness transformation step S1202, the image processing apparatus 110 applies the following transformation formula to the brightness of each pixel of the spread image g and determines a spread image $g_c$.

$$\phi_1(x)=2\sqrt{x+3/8}$$

In addition, in the brightness inverse transformation step S1204, the image processing apparatus 110 applies the following inverse transformation formula to the brightness of each pixel of the spread image $f_c^{(*)}$ and determines a spread image $f^{(*)}$.

$$\phi_2(x)=(x/2)^2-(1/8)$$

In this case, in the initial value setting step S601 in the optimization process step, a value corresponding to an L2 norm of fixed-pattern noise after the gradation transformation is set as a value of $\varepsilon$ (for example, $\varepsilon=N(M)^{1/2}$). This is because, in Anscombe transform, the standard deviation of Poisson noise after the brightness transformation is 1.

<Fifth Embodiment>

Methods of reducing fixed-pattern noise in an out-of-focus image group have been described in the previous embodiments. However, an application object of the present invention is not necessarily limited to an out-of-focus image group and the present invention is also applicable to moving image data.

When an image component (for example, a texture) of an image of an object changes significantly at a same pixel position in a group of a plurality of images, since brightness change which cancels the image component of the image of the object does not necessarily improve smoothness of the entire group of images, fixed-pattern noise can be reduced.

Figure 13A:
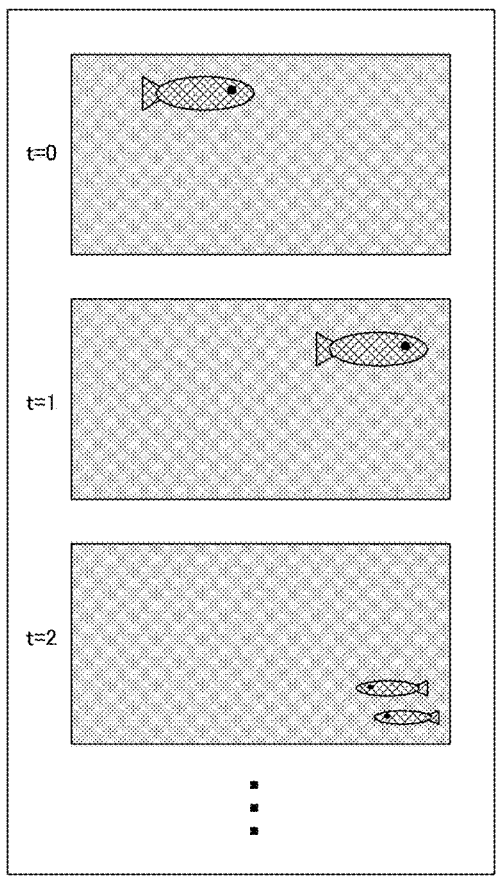
FIGS. 13A and 13B show examples of moving image data in which fixed-pattern noise can be reduced.
Figure 13B:
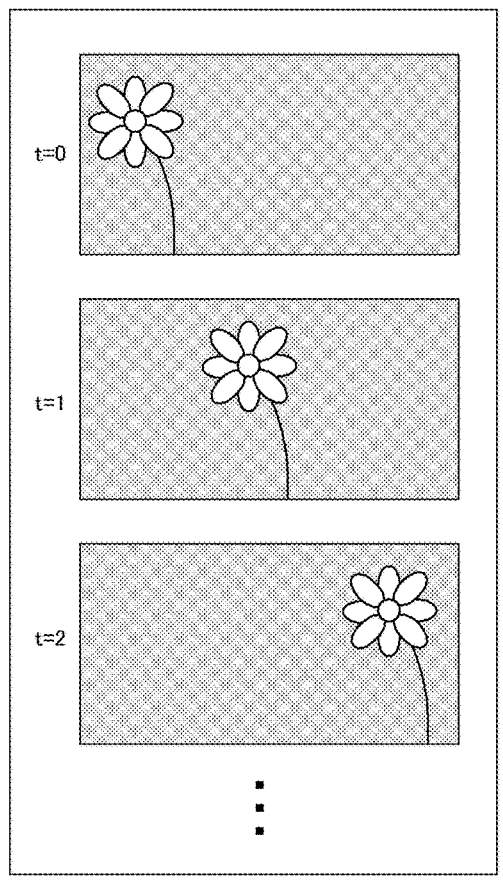

FIGS. 13A and 13B show an example of moving image data in which fixed-pattern noise can be reduced using the fixed-pattern noise reduction process according to the present embodiment.

FIG. 13A shows apart of a group of images constituting a moving image of swimming fish having been photographed by a fixed camera. Water of the sea or a fish tank is captured in the background. t=0, t=1, and t=2 on the left side of the images represent differences in photography times and fish are moving in the water. FIG. 13B shows a part of a group of images constituting a moving image of a flower that is a still object having been photographed by moving a camera with time. The background is empty. t=0, t=1, and t=2 represent differences in photography times and a position of the flower changes in each image. Although not illustrated, both pieces of moving image data is not limited to three images (frames) and are constituted by a large number (M number) of images (frames) which change over time. When observed per region, the group of images is constituted by a small number of images with high sharpness and a large number of smooth images in a similar manner to the out-of-focus image group shown in FIG. 4B. In addition, supposing that a plurality of images with high sharpness are present in a group of images constituted by a plurality of images, images of the object are to be totally different images. The fixed-pattern noise reduction processes described in the first to fourth embodiments can also be applied to a group of images such as that described above.

Hereinafter, a case where the fixed-pattern noise reduction process described in the first embodiment is applied will be described.

The image processing apparatus 110 can acquire moving image data $y_t \in R^{N \times N}$ (t=1, . . . , M) from the imaging apparatus 120, the storage apparatus 113, or the other computer system 114. The image processing apparatus 110 executes the fixed-pattern noise reduction process using a fixed-pattern noise reduction process program stored in the RAM 302 or the ROM 303.

Hereinafter, a process of reducing fixed-pattern noise in moving image data $y_1, \ldots, y_M$ will be described with reference to the flow chart shown in FIG. 5.

In the image input step S501, the image processing apparatus 110 acquires the moving image data $y_1, \ldots, y_M$ to which fixed-pattern noise of an image sensor has been added as an input image and determines a spread image g using the operation T. Next, in the optimization process step S502, the image processing apparatus 110 determines a spread image $f^{(*)}$ by reducing additive fixed-pattern noise in the spread image g. Finally, in the image output step S503, the image processing apparatus 110 uses the operation E to generate moving image data $x_1^{(*)}, \ldots, x_M^{(*)}$ from the spread image $f^{(*)}$ in which fixed-pattern noise has been reduced.

Since the number of images (number of frames) M in a time direction becomes extremely large in moving image data, the moving image data may be divided for every prescribed time or every prescribed number of frames, and each division may be used as an input image to be independently subjected to a fixed-pattern noise reduction process.

In addition, the fixed-pattern noise reduction process described in the third embodiment and shown in FIG. 11 may be applied. In this case, since estimated fixed-pattern noise is generated by selecting a part of images and the estimated fixed-pattern noise is reduced in moving image data as a whole, a calculation load can be reduced. Furthermore, by applying the fixed-pattern noise reduction process described in the second embodiment, multiplicative fixed-pattern noise can also be reduced.

Using the fixed-pattern noise reduction process described above in the present embodiment enables fixed-pattern noise included in moving image data to be reduced.

<Other Embodiments>

The first to fifth embodiments described above merely represent specific examples of the present invention and are not intended to limit the scope of the present invention to the configuration of the embodiments. Configurations of the respective embodiments may be appropriately modified and the embodiments may be combined with each other insofar as no technical contradictions arise.

In addition, in the fixed-pattern noise reduction processes described in the first to fifth embodiments, an image constituting an out-of-focus image group or moving image data can be divided into a plurality of blocks and a fixed-pattern noise reduction process can be performed in parallel on the respective blocks. Accordingly, processing can be performed at a higher speed.

Furthermore, while only cases where an out-of-focus image group or moving image data is constituted by a single channel have been described in the first to fifth embodiments, a fixed-pattern noise reduction process can also be applied in a case of a color image (for example, RGB) constituted by a plurality of color channels. For example, a fixed-pattern noise reduction process can be applied for each color channel. In addition, while only a case of reducing multiplicative fixed-pattern noise of which a standard deviation is proportional to brightness has been described in the second embodiment, by using a value obtained by a gradation transformation of brightness as the direction vector d instead of brightness, reduction of various types of fixed-pattern noises can be accommodated. For example, using a square root of brightness instead of brightness as elements of the direction vector d enables reduction of fixed-pattern noise of which dispersion is proportional to brightness to be accommodated.

Furthermore, an out-of-focus image group in which fixed-pattern noise has been reduced and data calculated based on the out-of-focus image group as calculated in the third embodiment may be set as the initial values to be used in the initial value setting step S601 according to the first and second embodiments. In this case, highly-accurate fixed-pattern noise reduction can be realized while suppressing a calculation load. Moreover, an out-of-focus image group in which fixed-pattern noise has been reduced and data calculated based on the out-of-focus image group by a fixed-pattern noise reduction method other than that of the third embodiment may be set as the initial values to be used in the initial value setting step S601.

The present invention can also be achieved by supplying a program that realizes one or more functions of the embodiments described above to a system or an apparatus via a network or a storage medium and having one or more processors in a computer in the system or the apparatus read and execute the program. Alternatively, the present invention can also be achieved by a circuit (for example, an ASIC) which realizes one or more functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-222001, filed on Nov. 12, 2015 and Japanese Patent Application No. 2016-148730, filed on Jul. 28, 2016, which are hereby incorporated by reference herein in their entirety.

What is claimed is:

1. An image processing method comprising:
   an input step in which a computer acquires data of a plurality of input images acquired by imaging performed using a same image sensor; and
   an optimization process step in which a computer determines an optimal solution of brightness change with respect to each input image by performing iterative calculations using an iterative method to improve overall image quality of the plurality of input images,
   wherein in the optimization process step, an optimal solution of brightness change for each pixel of each input image is determined under a condition that (a) common brightness change is performed with respect to pixels at a same position in respective input images and (b) a total amount of brightness change with respect to the plurality of input images does not exceed a prescribed value.

2. The image processing method according to claim 1, wherein the data of the plurality of input images is data of a plurality of images acquired by imaging an object while differentiating focusing positions in an optical axis direction of an imaging optical system.

3. The image processing method according to claim 2, wherein the imaging optical system is a double-telecentric optical system.

4. The image processing method according to claim 2, wherein the imaging optical system is an optical system constituting a microscope.

5. The image processing method according to claim 1, wherein the data of the plurality of input images is data of a plurality of frames constituting a moving image.

6. The image processing method according to claim 1, wherein the common brightness change performed with respect to pixels at a same position in respective input images is that a same value is added to or subtracted from brightness of pixels at a same position in respective input images.

7. The image processing method according to claim 1, wherein the common brightness change performed with respect to pixels at a same position in respective input images is that brightness of pixels at a same position in respective input images is multiplied or divided by a same value.

8. The image processing method according to claim 1, further comprising a brightness transformation step in which a computer applies a gradation transformation to brightness of each pixel in each input image,
   wherein in the optimization process step, an optimal solution of brightness change is determined using the input image subjected to the gradation transformation in the brightness transformation step.

9. The image processing method according to claim 8, wherein the brightness transformation step includes a step of applying a logarithmic transformation to brightness of each pixel in each input image.

10. The image processing method according to claim 9, wherein the brightness transformation step further includes a step of correcting brightness of each pixel in each input image subjected to logarithmic transformation by a value based on a standard deviation of multiplicative fixed-pattern noise of the image sensor.

11. The image processing method according to claim 1, wherein in the optimization process step, the prescribed value is set in accordance with brightness of the plurality of input images.

12. The image processing method according to claim 1, wherein the iterative method in the optimization process step uses an objective function including metrics for assessing whether or not the overall image quality of the plurality of input images has improved.

13. The image processing method according to claim 12, wherein the metrics is metrics representing smoothness of an image after brightness change.

14. The image processing method according to claim 12, wherein the metrics is metrics including an integral of an absolute value of a differential of brightness of each pixel in an image after brightness change.

15. The image processing method according to claim 12, wherein the metrics is metrics including an integral of an absolute value of a higher-order differential than a primary differential of brightness of each pixel in an image after brightness change.

16. The image processing method according to claim 1, further comprising a step in which a computer estimates fixed-pattern noise, which is attributable to the image sensor and which is included in brightness of each pixel in the input image, based on a difference or a ratio between an image after brightness change on which brightness change as an optimal solution determined in the optimization process step has been applied and the input image before the brightness change.

17. The image processing method according to claim 16, further comprising a step in which a computer generates an image in which fixed-pattern noise attributable to the image sensor has been reduced by subtracting the estimated fixed-pattern noise from an image captured by the image sensor.

18. The image processing method according to claim 1, wherein in the input step, from M number of images acquired by imaging by the image sensor, $M_s$ (where $M>M_s>1$) number of images are selected, and the $M_s$ number of selected images are used as the plurality of input images.

19. The image processing method according to claim 18, wherein in the input step, the $M_s$ number of images are selected by excluding an image with relatively high sharpness among the M number of images or selecting an image with relatively low sharpness among the M number of images.

20. The image processing method according to claim 1, wherein in the optimization process step, a plurality of images obtained by reducing in advance fixed-pattern noise attributable to the image sensor from the plurality of input images are set as initial values used in the iterative method.

21. A non-transitory computer-readable storage medium storing therein a program that causes a computer to execute respective steps of the image processing method according to claim 1.

22. An image processing apparatus comprising:
an input unit configured to acquire data of a plurality of input images acquired by imaging performed using a same image sensor; and
an optimization process unit configured to determine an optimal solution of brightness change with respect to each input image by performing iterative calculations using an iterative method to improve overall image quality of the plurality of input images,
wherein the optimization process unit determines an optimal solution of brightness change for each pixel of each input image under a condition that (a) common brightness change is performed with respect to pixels at a same position in respective input image and (b) a total amount of brightness change with respect to the plurality of input images does not exceed a prescribed value.

23. An image processing method comprising:
an input step in which a computer acquires data of a plurality of input images acquired by imaging performed using a same image sensor;
an optimization process step in which a computer determines an optimal solution of brightness change with respect to each input image by performing iterative calculations using an iterative method to improve overall image quality of the plurality of input images, wherein in the optimization process step, an optimal solution of brightness change for each pixel of each input image is determined under a condition that common brightness change is performed with respect to pixels at a same position in respective input images; and
a step in which a computer estimates fixed-pattern noise, which is attributable to the image sensor and which is included in brightness of each pixel in the input image, based on a difference or a ratio between an image after brightness change on which brightness change as an optimal solution determined in the optimization process step has been applied and the input image before the brightness change.

24. The image processing method according to claim 23, wherein the data of the plurality of input images is data of a plurality of images acquired by imaging an object while differentiating focusing positions in an optical axis direction of an imaging optical system.

25. The image processing method according to claim 24, wherein the imaging optical system is a double-telecentric optical system.

26. The image processing method according to claim 24, wherein the imaging optical system is an optical system constituting a microscope.

27. The image processing method according to claim 23, wherein the data of the plurality of input images is data of a plurality of frames constituting a moving image.

28. The image processing method according to claim 23, wherein the condition is that a same value is added to or subtracted from brightness of pixels at a same position in respective input images.

29. The image processing method according to claim 23, wherein the condition is that brightness of pixels at a same position in respective input images is multiplied or divided by a same value.

30. The image processing method according to claim 23, further comprising a brightness transformation step in which a computer applies a gradation transformation to brightness of each pixel in each input image,
wherein in the optimization process step, an optimal solution of brightness change is determined using the input image subjected to the gradation transformation in the brightness transformation step.

31. The image processing method according to claim 30, wherein the brightness transformation step includes a step of applying a logarithmic transformation to brightness of each pixel in each input image.

32. The image processing method according to claim 31, wherein the brightness transformation step further includes a step of correcting brightness of each pixel in each input image subjected to logarithmic transformation by a value based on a standard deviation of multiplicative fixed-pattern noise of the image sensor.

33. The image processing method according to claim 23, wherein the iterative method in the optimization process step uses an objective function including metrics for assessing whether or not the overall image quality of the plurality of input images has improved.

34. The image processing method according to claim 33, wherein the metrics is metrics representing smoothness of an image after brightness change.

35. The image processing method according to claim 33, wherein the metrics is metrics including an integral of an absolute value of a differential of brightness of each pixel in an image after brightness change.

36. The image processing method according to claim 33, wherein the metrics is metrics including an integral of an absolute value of a higher-order differential than a primary differential of brightness of each pixel in an image after brightness change.

37. The image processing method according to claim 23, further comprising a step in which a computer generates an image in which fixed-pattern noise attributable to the image sensor has been reduced by subtracting the estimated fixed-pattern noise from an image captured by the image sensor.

38. The image processing method according to claim 23, wherein in the input step, from M number of images acquired by imaging by the image sensor, $M_s$ (where $M > M_s > 1$) number of images are selected, and the $M_s$ number of selected images are used as the plurality of input images.

39. The image processing method according to claim 38, wherein in the input step, the $M_s$ number of images are selected by excluding an image with relatively high sharpness among the M number of images or selecting an image with relatively low sharpness among the M number of images.

40. The image processing method according to claim 23, wherein in the optimization process step, a plurality of images obtained by reducing in advance fixed-pattern noise attributable to the image sensor from the plurality of input images are set as initial values used in the iterative method.

41. An image processing method comprising:
an input step in which a computer acquires data of a plurality of input images acquired by imaging performed using a same image sensor;
an optimization process step in which a computer determines an optimal solution of brightness change with respect to each input image by performing iterative calculations using an iterative method to improve overall image quality of the plurality of input images, wherein in the optimization process step, an optimal solution of brightness change for each pixel of each input image is determined under a condition that common brightness change is performed with respect to pixels at a same position in respective input images; and
a brightness transformation step in which a computer applies a gradation transformation to brightness of each pixel in each input image,
wherein in the optimization process step, an optimal solution of brightness change is determined using the input image subjected to the gradation transformation in the brightness transformation step, and
wherein the brightness transformation step includes (a) a step of applying a logarithmic transformation to brightness of each pixel in each input image and (b) a step of correcting brightness of each pixel in each input image subjected to logarithmic transformation by a value based on a standard deviation of multiplicative fixed-pattern noise of the image sensor.

42. A non-transitory apparatus-readable storage medium storing therein a program that causes an apparatus to execute respective steps of the image processing method according to claim 23.

43. A non-transitory apparatus-readable storage medium storing therein a program that causes an apparatus to execute respective steps of the image processing method according to claim 41.

44. An image processing apparatus comprising:
an input unit configured to acquire data of a plurality of input images acquired by imaging performed using a same image sensor;
an optimization process unit configured to determine an optimal solution of brightness change with respect to each input image by performing iterative calculations using an iterative method to improve overall image quality of the plurality of input images, wherein the optimization process unit determines an optimal solution of brightness change for each pixel of each input image under a condition that common brightness change is performed with respect to pixels at a same position in respective input image; and
a unit which estimates fixed-pattern noise, which is attributable to the image sensor and which is included in brightness of each pixel in the input image, based on a difference or a ratio between an image after brightness change on which brightness change as an optimal solution determined in the optimization process unit has been applied and the input image before the brightness change.

* * * * *